(12) United States Patent
Rao

(10) Patent No.: US 7,840,772 B2
(45) Date of Patent: Nov. 23, 2010

(54) PHYSICAL MEMORY CONTROL USING MEMORY CLASSES

(75) Inventor: Anil Rao, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 164 days.

(21) Appl. No.: 10/939,052

(22) Filed: Sep. 10, 2004

(65) Prior Publication Data

US 2006/0059323 A1 Mar. 16, 2006

(51) Int. Cl.
G06F 12/02 (2006.01)
(52) U.S. Cl. ............... 711/170; 711/152; 711/171; 711/173
(58) Field of Classification Search ............ 711/170, 711/152, 171, 173
See application file for complete search history.

(56) References Cited

U.S. PATENT DOCUMENTS

| 5,950,221 | A * | 9/1999 | Draves et al. ............... 711/100 |
| 6,789,256 | B1 | 9/2004 | Kechriotis et al. |
| 2002/0133530 | A1 | 9/2002 | Koning |
| 2003/0101324 | A1 * | 5/2003 | Herr et al. ............... 711/170 |
| 2003/0200398 | A1 * | 10/2003 | Harris ............... 711/152 |
| 2006/0059318 | A1 | 3/2006 | Rao |

OTHER PUBLICATIONS

U.S. Appl. No. 10/939,047, Office Action dated Aug. 17, 2009, pp. 1-7 with attachments.
U.S. Appl. No. 10/939,047, Office Action dated Nov. 2, 2006, pp. 1-6 with attachments.
U.S. Appl. No. 10/939,047, Office Action dated Apr. 15, 2008, pp. 1-7.
U.S. Appl. No. 10/939,047, Office Action dated Jul. 11, 2008, pp. 1-6.
U.S. Appl. No. 10/939,047, Office Action dated Nov. 28, 2008, pp. 1-7.

* cited by examiner

*Primary Examiner*—Hong Kim
*Assistant Examiner*—Jae U Yu

(57) ABSTRACT

A method for allocating memory in a computer system is disclosed. The method includes creating a kernel memory class, the kernel memory class acting as a logical container for at least a first kernel memory resource group. The method further includes processing a kernel client's request for additional memory by ascertaining whether there is sufficient free memory in the first kernel memory resource group to accommodate the kernel client's request. The method additionally includes denying the kernel client's request if there is insufficient free memory in the first kernel memory resource group to accommodate the kernel client's request.

38 Claims, 16 Drawing Sheets

MRG_CREATE

MRG_REMOVE

MRG_GET_ATTR

MRG_SET_ATTR

MRG_GET_PROC_AFF

MRG_SET_PROC_AFF

MRG_GET_OBJ_AFF

MRG_SET_OBJ_AFF

MRG_NUM_OBJ

MRG_GET_STATS

FIG. 7

PHYSICAL MEMORY CONTROL USING MEMORY CLASSES

RELATED APPLICATIONS

The invention is related to U.S. Ser. No. 10/939,047, entitled "MANAGING SHARED MEMORY USAGE WITHIN A MEMORY RESOURCE GROUP INFRASTRUCTURE", filed on Sep. 10, 2004, and incorporated by reference herein

BACKGROUND OF THE INVENTION

In a computer system, such as a server, multiple processes may be running concurrently. These processes share the physical memory of the computer system for their memory needs. With reference to FIG. 1A, processes 102, 104, 106, 108, and 110 all share the memory space 112 of the computer system. If the total amount of memory required by the concurrently executing processes is less than the total physical memory available, each process can execute without experiencing memory access related delays. On the other hand, if the total amount of memory required exceeds the total amount of memory available, memory paging occurs in order to ensure that all processes have sufficient memory to execute.

Paging, as is known, involves swapping the contents of physical memory into and out of disk-based storage, such as a hard drive to extend the logical memory available to a process. Because the memory access speed for disk-based storage is significantly slower than for semiconductor-based storage, paging affects the execution speed of the process being paged.

In some cases, it is desirable to guarantee a certain amount of physical memory to a process or a group of processes. In the prior art, different approaches have been taken to ensure that a process or a group of processes has a guaranteed amount of physical memory during execution. The brute force approach involves having a process lock down a certain amount of physical memory, which may then only be used by that particular process. Although this approach ensures that the process will have a guaranteed amount of physical memory, it is inefficient since other processes cannot utilize memory that is locked even if the process that locks down that memory does not truly need all of it at all times for its execution. Secondly, memory locking is a privileged operation that is not available to ordinary applications.

Another approach based on the external page-cache management scheme lets processes have direct control over their share of physical memory through special primitives provided by the operating system. A sophisticated application can exploit this feature to implement a dedicated memory management policy that best suits its requirements. However, this approach is not backward compatible with existing applications since a legacy application may not be aware of such primitives and would be at a disadvantage when executing in an environment wherein other applications directly control their physical memory requirements.

Another approach involves using a special application program to manage physical memory consumption. This program, known as the Resource Manager, queries the operating system periodically to determine the amount of physical memory being used by every process on the system. When the available memory on the system is low the Resource Manager picks processes that are exceeding their share and tries to force them to shrink in size. This is achieved by stopping the selected processes via signals and process priority changes and then relying on the system memory pager to reclaim non-recently referenced pages of physical memory. In this form of control all of the necessary logic is implemented by the Resource Manager program, a user application, and does not require any modifications to the operating system. However, it is not very deterministic and problems can arise, for instance, if a target process has set up its own signal handlers to ignore signals sent from the Resource Manager.

Memory resource grouping represents another approach to address the physical memory control issue. In memory resource grouping, the physical memory is divided into logical blocks called MRGs. Referring now to FIG. 1B, processes 130, 132, and 134 are assigned to MRG 136 of a computer system 150, while processes 138 and 140 are assigned to MRG 142. In dividing the physical memory space into MRGs, the memory utilization of processes associated with one MRG does not impact the memory utilization in another MRG. For example, even if processes 138 and 140 each requires a vast amount of memory and thus a lot of paging activities need to be performed with respect to the memory assigned to MRG 142, the amount of memory available to MRG 136 is not affected. Thus memory resource grouping is a way to provide memory isolation to a group of processes.

Memory resource grouping also has other advantages. A MRG (such as MRG 136) can be set up to import from another MRG or export memory to another MRG. This form of controlled sharing allows the resources of an under-utilized MRG (that is willing to export) to be used by an over-loaded MRG (that has import capability), leading to higher overall physical memory utilization on the computer system.

Unfortunately, memory resource grouping has only been applied thus far to private memory of processes. To further explain this issue, FIG. 2 shows the various memory resource types that may exist in physical memory. With reference to FIG. 2, physical memory may involve kernel memory 202, and user resource types 204. User resource types 204 include process private memory 206, local shared memory 208, and global shared memory 210 (which includes shared text memory 210A and shared library memory 210B).

Kernel memory refers to the memory used by the operating system kernel. User resource types refer to the various memory types that may be involved with process execution. For example, process private memory 206 includes the data memory, stack or heap memory specific to a process during execution. Local shared memory 208 may include, for example, a memory-mapped file segment that is shared between specific processes.

Shared text memory 210A may include, for example, text that is shared by identical copies of programs executing in a computer system (i.e., such global shared memory is not specific to any process or groups of processes). Likewise, shared library memory 210B may include, for example, certain libraries of code that are shared by all processes executing in a computer system.

As shown in FIG. 2, different segments of private memory 206 may be assigned to different MRGs, such as MRGs 220, 222 and 224. These different private memory fragments may be created by different processes, for example.

As mentioned, the paradigm of grouping memory in different MRGs has been confined to private memory thus far. Partitioning private memory is less complicated than partitioning local shared memory or partitioning global shared memory since each private memory segment (or object) is affiliated with only one process. As currently implemented, it is not possible to extend memory resource grouping to either local shared memory or global shared memory.

To elaborate, consider the situation in FIG. 3. In FIG. 3, process 302 and process 304 are affiliated with respective MRGs 352 and 354. These process affiliations are represented by private affiliations 312 and 314 respectively. The private affiliations are typically assigned to the processes, e.g., by the system administrator or by inheritance during forking (i.e., the child process inherits the same affiliation as the parent process after being forked in the unix environment).

Process 302 creates three private segments 302A, 302B, and 302C during execution. These private segments are automatically affiliated (by the operating system) with the MRG 352 since there is a private affiliation 312 between process 302 and MRG 352. Accordingly, the memory required by memory segments 302A, 302B, and 302C are allocated only from MRG 352.

Likewise, process 304 creates three private segments 304A, 304B, and 304C during execution. These private segments are automatically affiliated (by the operating system) with the MRG 354 since there is a private affiliation 314 between process 304 and MRG 354. Accordingly, the memory required by memory segments 304A, 304B, and 304C are allocated only from MRG 354. Logically speaking, each of process 302 and process 304 has been partitioned to use only the memory associated with the MRG to which it is affiliated for its private memory needs (i.e., MRG 352 for process 302 and MRG 354 for process 304).

Now consider the shared memory situation. If process 302 and process 304, which are affiliated with different MRGs for their private memory needs, need to share a memory segment (i.e., either local shared memory or global shared memory), a methodology needs to exist to allow these processes to share a memory segment across the logical partitions that divide the MRGs. Furthermore, a methodology needs to be developed to allow a shared memory segment (either local or global) to be shared by processes even if the process that created that shared memory segment detaches from it or no longer exists. This is unlike the situation with a private memory segment wherein the private memory segment is deallocated if it is detached from its creator process or if its creator process terminates.

Additionally, the sharing needs to be transparent from the load-balancing perspective in that it is important to be able to move a process from one MRG to another MRG without undue restriction even if that process shares a memory segment with another process that may be assigned to any of the MRGs. For example, requiring that processes sharing a memory segment to be assigned to the same MRG would ensure that these processes can share the same memory segment but would impose an undue restriction on the ability to move a process from one MRG to another MRG during load balancing. For backward compatibility reasons, the methodology also needs to work within the existing application semantics and memory resource grouping infrastructure.

The aforementioned related application entitled "MANAGING SHARED MEMORY USAGE WITHIN A MEMORY RESOURCE GROUP INFRASTRUCTURE" is directed toward providing physical memory isolation for shared memory segments. However, unless kernel memory usage can also be managed, it is impossible to meaningfully guarantee, in some cases, physical memory to user memory types (e.g., private memory, local shared memory, or global shared memory) if such a guarantee is desired. This is because typically there is no restriction on memory usage by the kernel and as a result the user memory types may still be starved if the kernel memory is allowed to expand without limits. Additionally, the kernel typically comprises a plurality of kernel subsystems, such as the networking subsystem, the file buffer cache subsystem, the storage subsystem, and the like. If kernel memory control is lacking, one or more kernel subsystem may be memory-starved if another kernel subsystem is allowed to exclusively hold an undue amount of memory.

SUMMARY OF INVENTION

The invention relates, in an embodiment, to a method for allocating memory in a computer system. The method includes creating a kernel memory class, the kernel memory class acting as a logical container for at least a first kernel memory resource group. The method further includes processing a kernel client's request for additional memory by ascertaining whether there is sufficient free memory in the first kernel memory resource group to accommodate the kernel client's request. The method additionally includes denying the kernel client's request if there is insufficient free memory in the first kernel memory resource group to accommodate the kernel client's request.

In another embodiment, the invention relates to an arrangement for allocating memory in a computer system. There is included a reservation layer having a first reservation level and a second reservation level. The first reservation level includes a kernel memory class, the kernel memory class being mapped to at least a first portion of physical memory in the computer system. The first reservation level further includes a user memory class, the user memory class being mapped to at least a second portion of physical memory in the computer system.

In yet another embodiment, the invention relates to a method for guaranteeing a minimum amount of physical memory to a user client. The method includes affiliating the user client with a user memory resource group, the user memory group being associated with a user memory class, a size of the user memory resource group being set to be at least a size of the minimum amount of physical memory. The method also includes pre-reserving a chunk of memory associated with a system memory resource group, the chunk of memory having at least the size of the minimum amount of physical memory, the system memory resource group being part of a memory resource class.

In yet another embodiment, the invention relates to method for guaranteeing a minimum amount of physical memory to a kernel client. The method includes affiliating the kernel client with a kernel memory resource group. The kernel memory group is associated with a kernel memory class, a size of the kernel memory resource group being set to be at least a size of the minimum amount of physical memory. There is included pre-reserving a chunk of memory associated with a system memory resource group. The chunk of memory has at least the size of the minimum amount of physical memory, the system memory resource group being part of a memory resource class.

In yet another embodiment, the invention relates to a method for rendering an additional amount of physical memory available for use by an operating system. There is included adding the additional amount of physical memory to a memory class of the operating. The additional amount being added using a temporary memory resource group has a size that is at least equal to a size of the additional amount of physical memory to be added, the adding being performed without taking memory from a default memory resource group of the memory class. The method also includes deleting the temporary memory resource group, thereby causing the additional amount of physical memory to be added to the default memory resource group.

In yet another embodiment, the invention relates to a method for removing an amount of physical memory available for use by an operating system. The method includes creating a temporary memory resource group in a memory class. The memory resource group has a size that is at least equal to a size of the amount of physical memory to be removed, the creating causing a chunk of memory that is at least equal to the size of the amount of physical memory to be removed to be taken from a default memory resource group of the memory class. The method includes deleting the temporary memory resource group, thereby causing the amount of physical memory to be removed from the memory class.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIG. 7 shows, in accordance with an embodiment of the present invention, some example primitives that may be employed to manage memory sharing.

DETAILED DESCRIPTION OF EMBODIMENTS

Figure 1A:
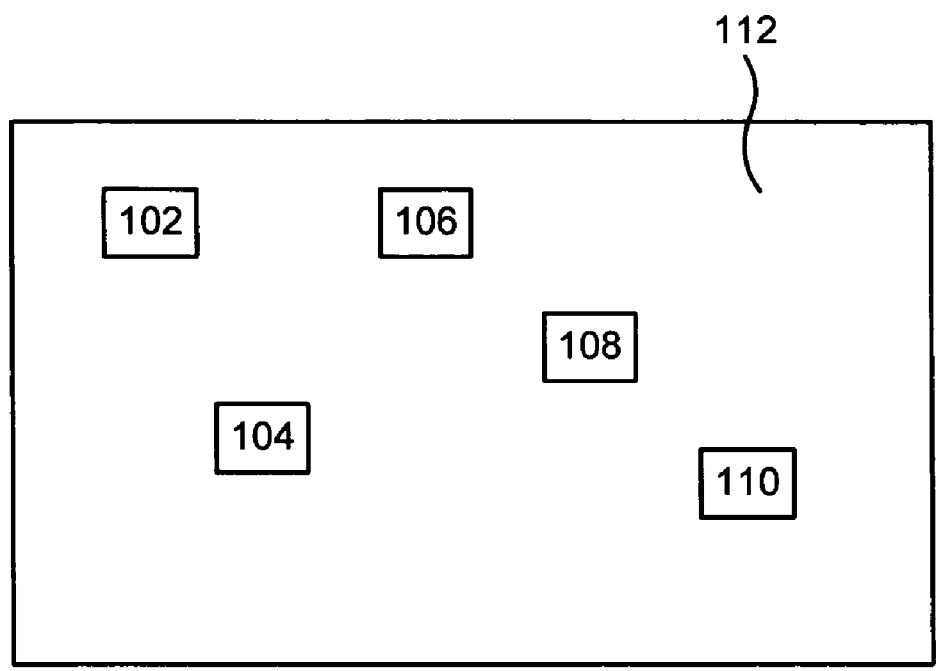
FIG. 1A shows multiple processes sharing the memory space of a computer system.
Figure 1B:
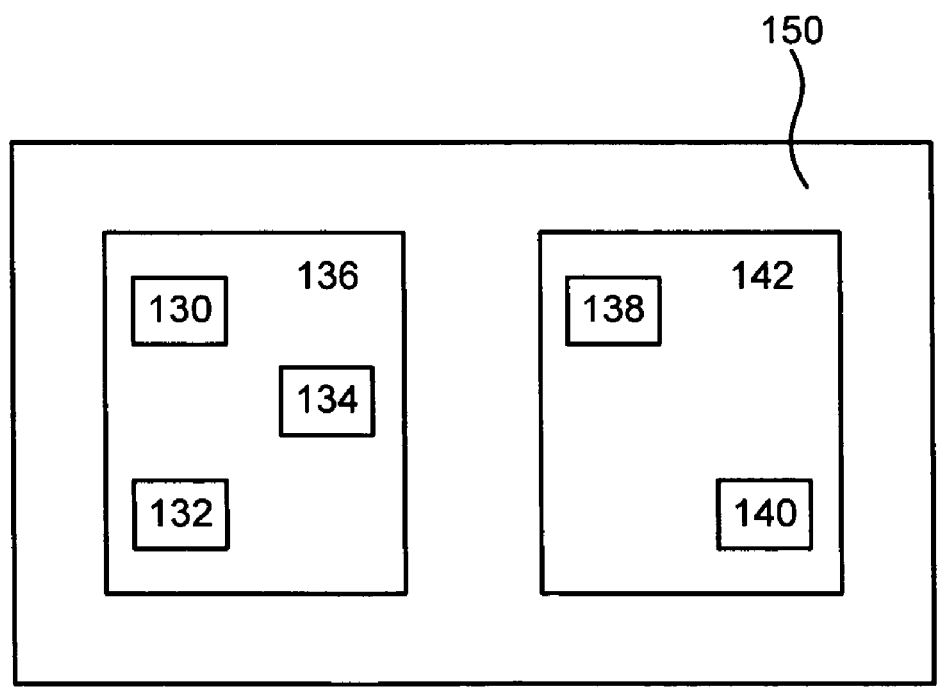
FIG. 1B illustrates the concept of memory resource groups.
Figure 2:
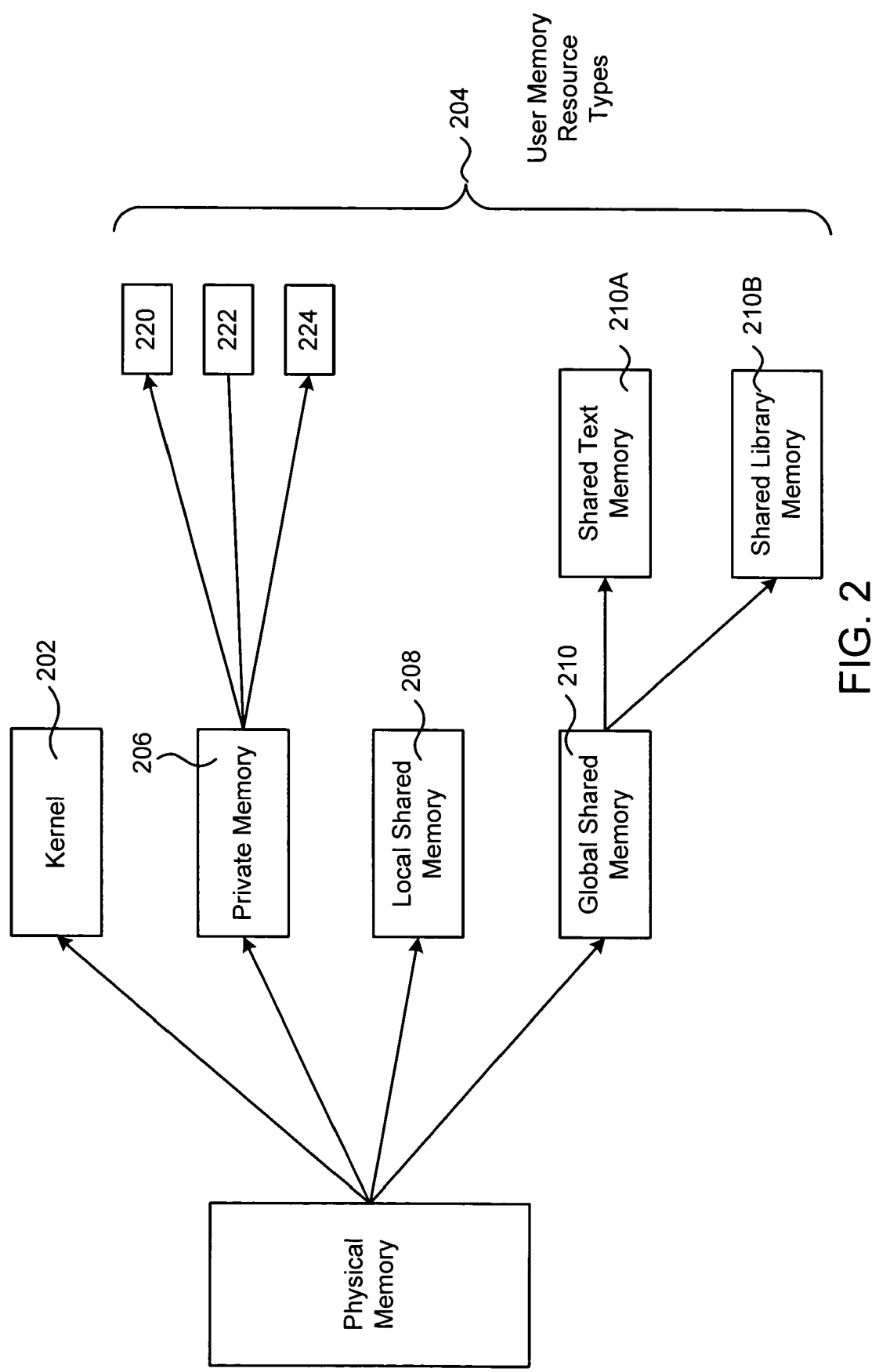
FIG. 2 shows the various memory resource types that may exist in physical memory.
Figure 3:
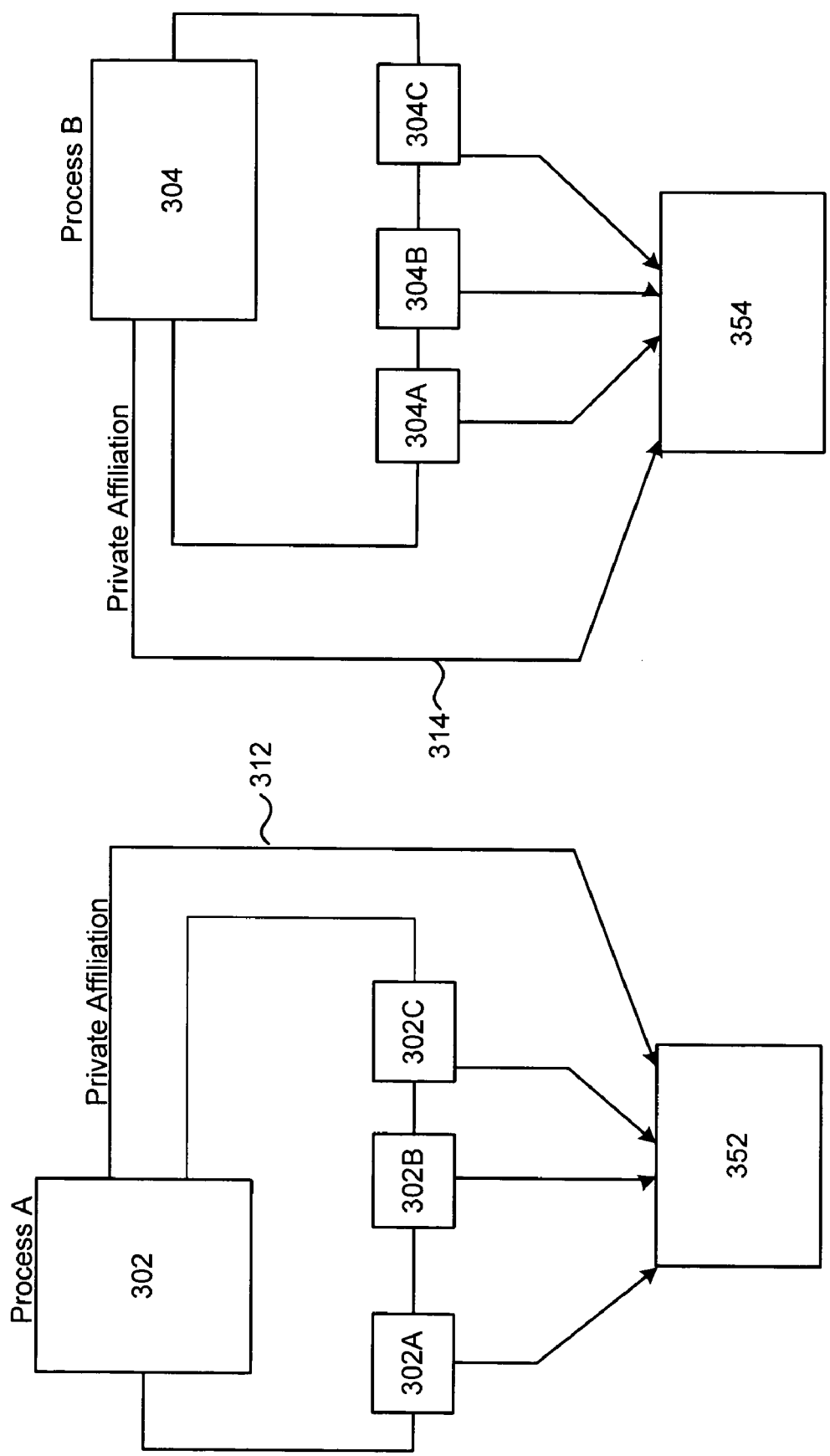
FIG. 3 shows the sharing of private memory of processes using memory resource groups.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general purpose computer and/or a dedicated computing device when appropriately programmed and may include a combination of a computer/computing device and dedicated/programmable circuits adapted for the various tasks pertaining to embodiments of the invention.

In accordance with embodiments of the present invention, there are provided methods and arrangements for allowing processes to share local shared memory segments and to share global shared memory segments without impacting the ability to partition processes among MRGs and without placing undue restrictions on the ability to load-balance among MRGs. In an embodiment, if a process creates a local shared memory segment, that local shared memory segment is allocated memory from the MRG that is associated with the creator process.

In the context of local shared memory, the association between a process and a MRG is governed, as will be seen, by a shared affiliation that is established for the process either by inheritance or by the operator of the computer system.

To elaborate, when the computer system starts up, the first process that executes may employ memory from a default MRG. This default MRG occupies the entire available physical memory until another MRG is created (e.g., by the system administrator), causing the two MRGs to share the available physical memory. Furthermore, processes that start up may be defaulted to the default MRG unless they are reassigned (via the affiliation mechanism) to another MRG. With respect to inheritance, a child process that forks from a parent process inherits the affiliations of the parent process. Forking is a concept well known in unix and will not be discussed in details herein.

Further, note that affiliations are type-specific, i.e., an affiliation is specific as to the memory resource type. For example, a process may have its private affiliation with one MRG and a shared affiliation with another MRG. Global shared memory, on the other hand, is not specific to any process since by definition, the global shared memory may be shared by any process. Accordingly, there exists, as will be shown later herein, a global shared affiliation for each global shared memory resource type. However, there is no creator process for a global shared memory segment in the same sense that there is a creator process for a local shared memory segment.

In the current example, if a second process wishes to share that local shared memory segment, memory for such sharing by the second process is allocated not from the MRG associated with (by virtue of the local shared affiliation mechanism) that second process but from the MRG associated with (again, by virtue of the local shared affiliation mechanism) the process that created that local shared memory segment. In this manner, many different processes having shared affiliations with different MRGs can still share a particular local shared memory segment, and all memory required for such sharing is allocated from the MRG associated with (by virtue of the local shared affiliation mechanism) the process that created that shared memory segment. Furthermore, these sharing processes may be moved among MRGs of the computer system (e.g., for load balancing) without impacting the ability to continue sharing the local shared memory segment.

If the process that created a local shared memory segment detaches from that local shared memory segment or terminates, the local shared memory segment is considered to be orphaned. The orphan concept allows sharing to continue and, as will be discussed, load-sharing to occur. In this case, the orphaned local shared memory segment is allowed to continue to use the memory of the MRG that is affiliated with the process that created that local shared memory segment.

Furthermore, embodiments of the invention provide a facility to allow the system administrator to ascertain the orphaned local shared memory segments in a given MRG, as well as a facility to allow the system administrator to move orphaned local shared memory segments from one MRG to another MRG for load-balancing purposes.

With respect to global shared memory, since a global shared memory resource type may be shared by any process and is not affiliated with any particular process or group of processes, the global shared memory segments of that resource type may be associated with (by virtue of a global shared affiliation) a particular MRG. Any process may share a global shared memory segment by attaching to it, irrespective of its own private and/or local shared affiliations. Memory required for such sharing is allocated out of the MRG affiliated with (by virtue of the global shared affiliation mechanism, which is created by the operator of the computer system) the resource type to which the global shared memory segment belongs. The same facilities that exist to allow a process to move orphaned local shared memory segments among MRGs may be employed to manage the global shared memory.

Figure 4:
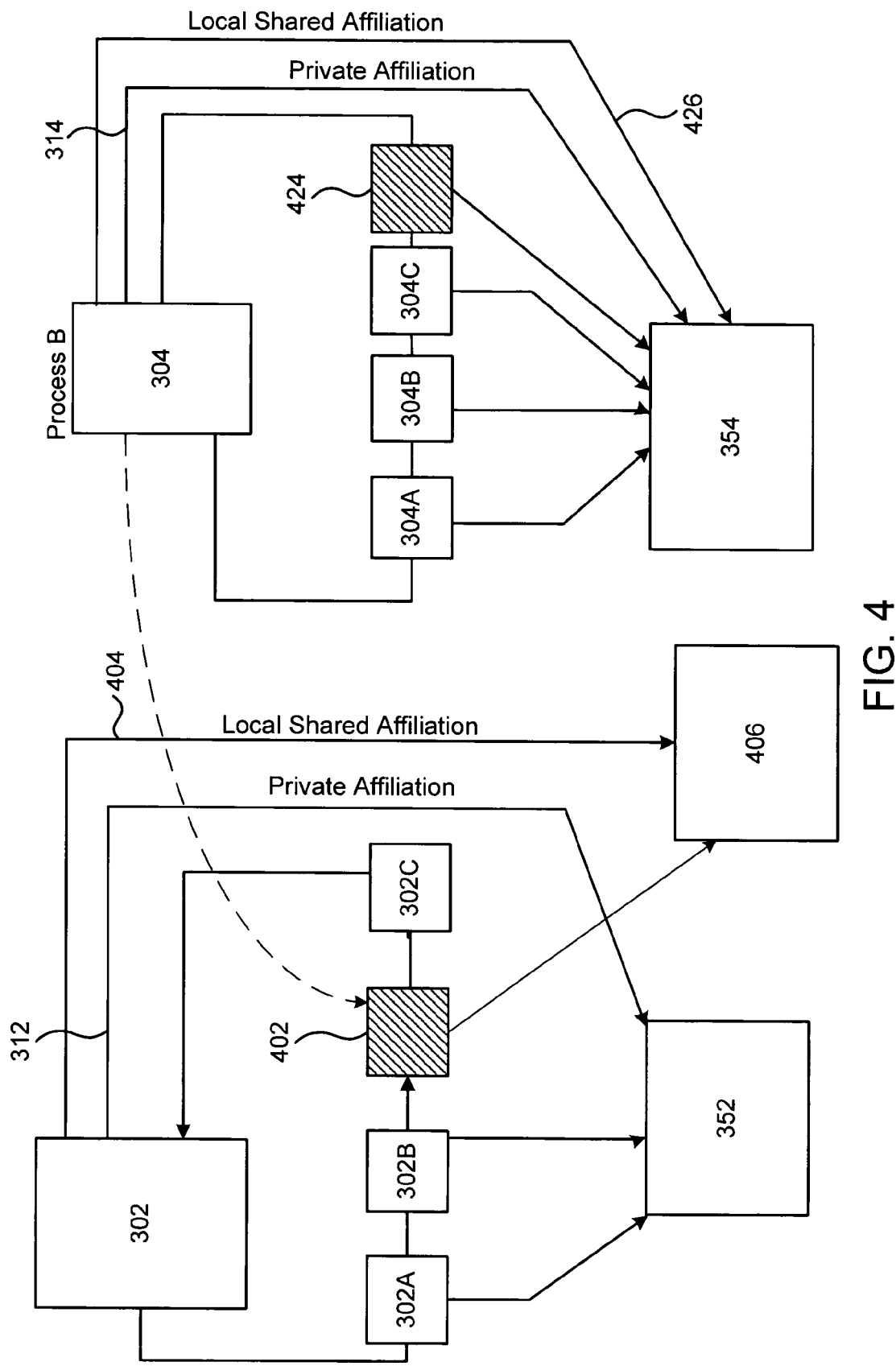
FIG. 4 shows, in accordance with an embodiment of the present invention, an example arrangement whereby a plurality of processes can share a local shared memory segment.

The invention may be better understood with reference to the figures and discussions herein. FIG. 4 shows, in accordance with an embodiment of the present invention, an example arrangement whereby processes 302 and 304 can share a local shared memory segment 402. As before, process 302 creates three private memory segments 302A, 302B, and 302C, which are affiliated with MRG 352 since MRG 352 has an affiliation (by virtue of the private affiliation 312) with process 302. Again, process 304 creates three private memory segments 304A, 304B, and 304C, which are affiliated with MRG 354 since MRG 354 has an affiliation (by virtue of the private affiliation 314) with process 304.

FIG. 4 further shows a local shared memory segment 402, representing a local shared memory segment that is created by process 302. Since MRG 406 is associated with local shared affiliation 404, which shows the affiliation with (or involves) process 302, memory allocation is made for local shared memory segment 402 from MRG 406.

Likewise, FIG. 4 further shows a local shared memory segment 424, representing a shared local memory segment that is created by process 304. Since MRG 354 is associated with local shared affiliation 426, which shows the affiliation with (or involves) process 304, memory allocation is made for local shared memory segment 424 from MRG 354.

If local shared memory segment 402 is configured to be shared between creator process 302 and process 304, process 304 may share that shared local memory segment 402. However, memory allocation for such sharing by process 304 is performed using the memory of MRG 406, i.e., the MRG associated with the local shared affiliation involving the process that originally created the local shared memory segment. Note that this is the case despite the fact that process 304 has a local shared affiliation 426, which affiliates process 304 with MRG 354 for local shared memory. The memory allocation to accommodate the sharing by process 304 of local shared memory segment 402 is not made from MRG 354 since MRG 354 is not associated with the local shared affiliation that involves the creator process of local shared memory segment 402 (i.e., creator process 302).

Figure 5:
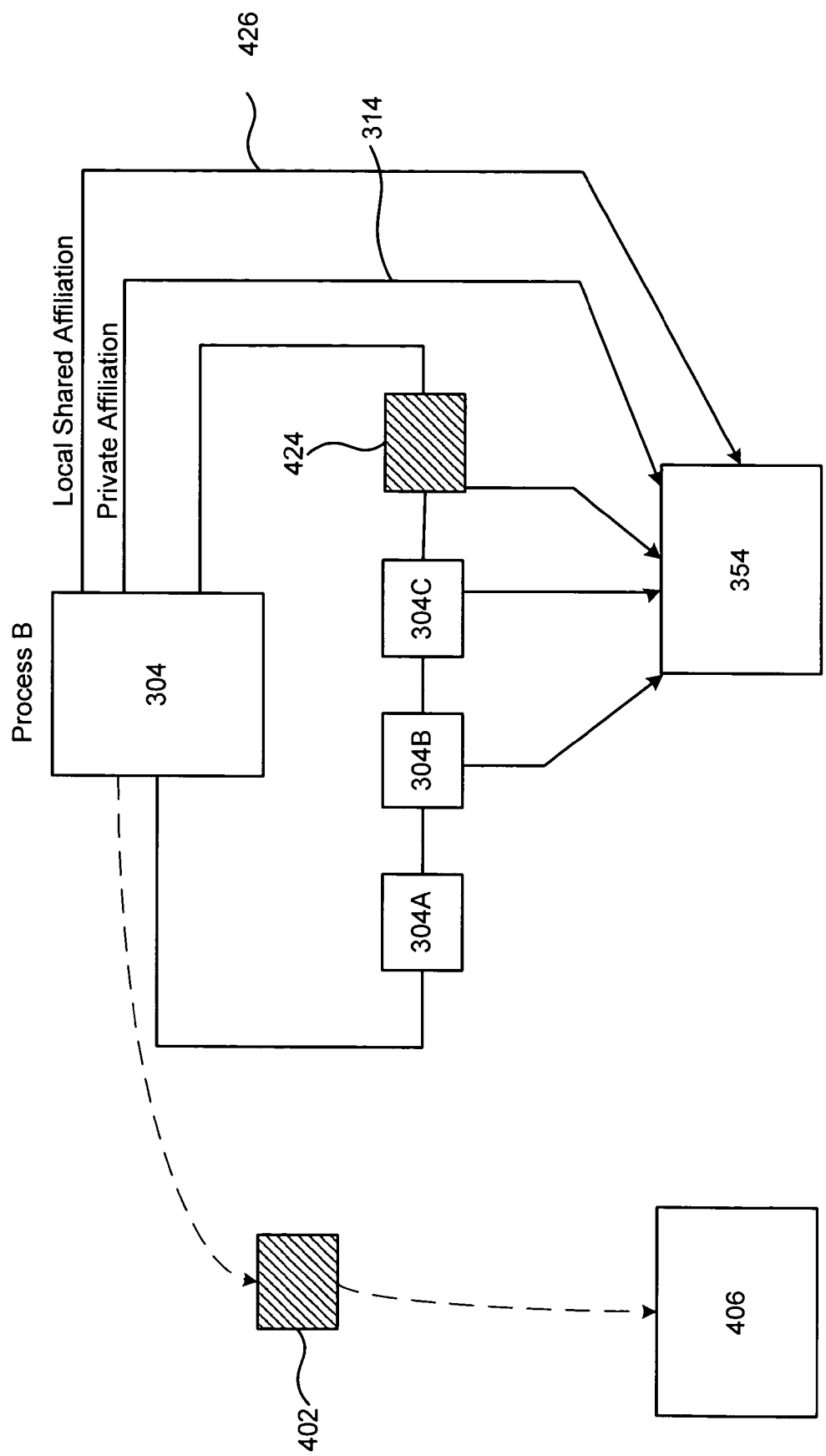
FIG. 5 shows, in accordance with an embodiment of the present invention, an example arrangement whereby a plurality of processes can still share a local shared memory segment even if the originator process has detached itself from the local shared memory segment it created.

Other processes may share local shared memory segment 402 in the same manner and have the memory allocation therefor performed using memory from MRG 406. If process 302 detaches from shared local memory segment 402 or terminates, local shared memory segment 402 continues to exist in MRG 406 and may continue to be shared as an orphaned local shared memory segment among the other processes. This is shown in FIG. 5 in which process 302 has detached itself from local shared memory segment 402.

In an embodiment, a local shared memory segment includes attributes that allows it to be identified as an orphaned memory segment to a primitive (i.e., command) querying about the existence of such orphaned memory segments in a MRG. An application programming interface (API) is provided to extract this information from the kernel. Furthermore, an API is also provided to allow a system administrator to move all orphaned local shared memory segments from one MRG to another MRG (e.g., for load balancing purposes). The linkage between a process sharing an orphaned local shared memory segment and that local shared memory segment is maintained when an orphaned local shared memory segment is moved from one MRG to another MRG, thereby allowing process execution to continue.

In this manner, logical partitioning of processes to different MRGs may be maintained even if these processes share one or more local shared memory segments. Such logical partitioning makes it possible to guarantee a certain process or group of processes a certain amount of physical memory during execution. Additionally, the orphan concept allows sharing to continue even if the process that created a local shared memory segment subsequently terminates or detaches from that local shared memory segment. Furthermore, since the linkage between a process and a local shared memory segment is maintained if the process is moved from one MRG to another MRG, the ability of the computer system to load balance among MRGs is not impacted.

Figure 6:
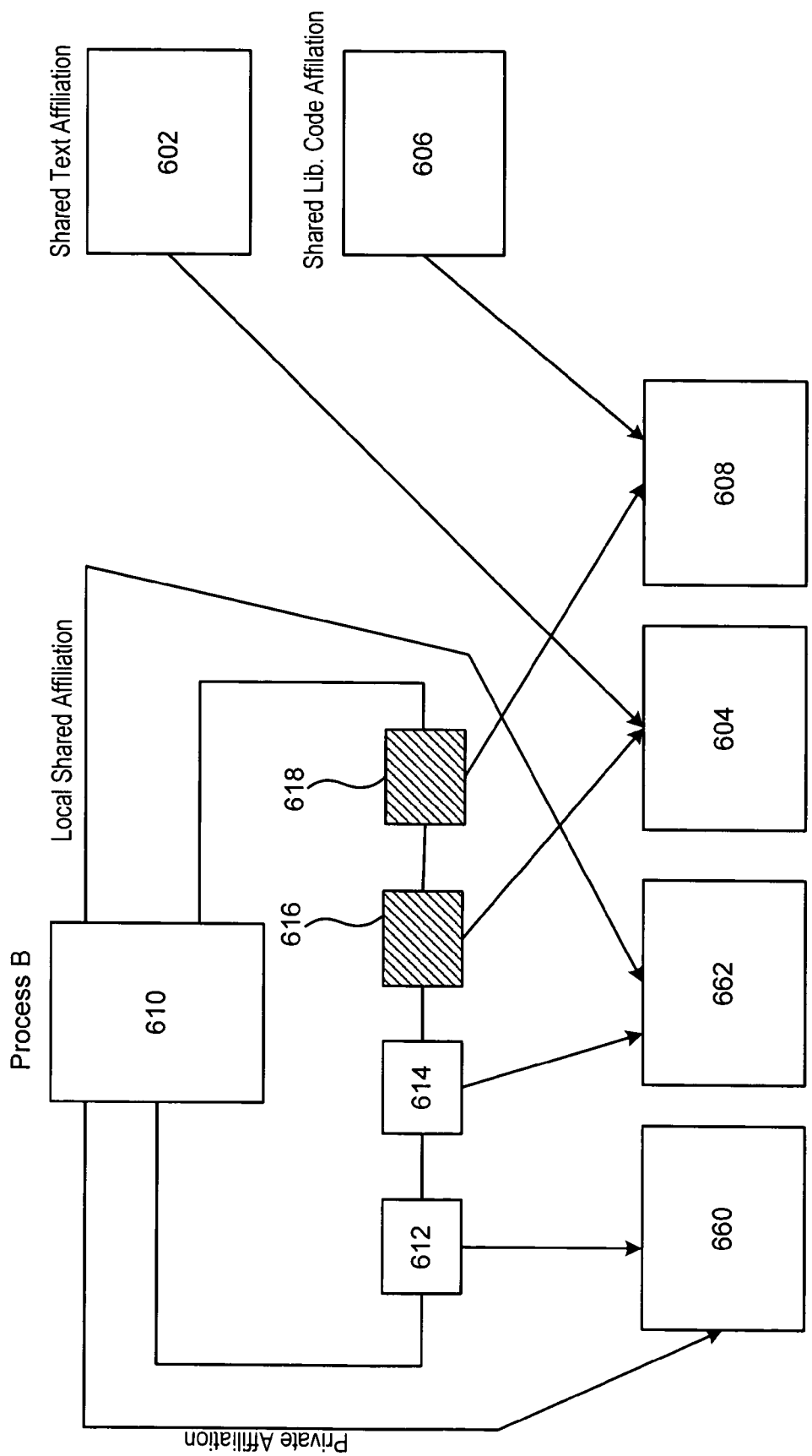
FIG. 6 shows, in accordance with an embodiment of the present invention, an example arrangement in which global shared affiliations have been designated for the shared text memory resource type and for the shared library code memory resource type.

FIG. 6 shows, in accordance with an embodiment of the present invention, an example arrangement in which global shared affiliations have been designated for the shared text memory resource type (which is a global shared memory type) and for the shared library code memory resource type (which is also a global shared memory type). Since a global shared memory resource type may be shared by any process and is not affiliated with any particular process or group of processes, the global shared memory segments of that resource type may be affiliated with a particular MRG. A global shared affiliation of this nature is set up during system startup (by the system administrator, for example) for each global shared memory resource type. These global shared affiliations are shown in FIG. 6 by shared text affiliation 602 to a MRG 604 and shared library code affiliation 606 to a MRG 608.

Thereafter, a process such as process 610 may create a plurality of private memory segments 612 and 614 in the manner described earlier. Process 610 may also create a global shared memory segment 616 that consumes the shared text memory resource type. The allocation for this sharing is made from MRG 604 since there is an affiliation of the same memory resource type text (i.e., shared text affiliation 602) to MRG 604.

Process 610 may also create a global shared memory segment 618 that consumes the shared library code memory resource type. The allocation for this sharing is made from MRG 608 since there is an affiliation of the same memory resource type library code (i.e., shared library code affiliation 606) to MRG 608.

In the example of FIG. 6, it is assumed that all shared text objects are treated as a single entity for the purpose of affiliating with a MRG (e.g., all shared text objects are affiliated as a single entity to MRG 604 by shared text affiliation 602). In another embodiment, it may be advantageous to partition a global shared memory resource type (whether text or library code) among different MRGs to guarantee a particular global shared memory object a certain amount of physical memory during execution. In this case, the method not only ascertains the global affiliation of the same memory type but also another association indicia to decide on the particular resource group to allocate memory from.

For example, if two different shared text objects (e.g., binary code A and binary code B) are affiliated with two different MRGs (e.g., MRG 1 and MRG 2 respectively), the decision regarding which MRG to employ for allocation when a process creates a shared text memory segment involves not only ascertaining the global affiliation of the memory type text but also involves at least one other association criteria. This is because ascertaining only the global affiliation of the memory type text would result in two possible answers: MRG1 and MRG2. The name of the application may be the other association criteria. For example, if it is desired that any process sharing any or all of binary code A be allocated memory from MRG1, the method applies the additional association criteria (i.e., the identity of binary code A) to resolve the MRG from which allocation should be made.

As mentioned, an API may be provided to facilitate moving orphaned local shared memory segments among MRGs. The same API and facility may be employed to facilitate moving global shared memory objects among MRGs. For example, the system administrator may employ a primitive to move all shared text segments from one MRG to another MRG.

FIG. 7 shows some example primitives that may be employed to manage memory sharing. MRG_CREATE is employed to create a MRG. MRG_REMOVE is employed to remove a MRG. MRG_GET_ATTRIBUTE is employed to get attributes of a MRG. Attributes include, for example, the current size and import/export capabilities of a given MRG. MRG_SET_ATTRIBUTE is employed to set attributes of a MRG. MRG_GET_STATS is employed to get various memory management related statistics of a MRG (available memory, number of members, number of page-faults, number of deactivated-processes, etc.).

MRG_GET_PROC_AFF is employed to obtain the MRG affiliations of a process (for private memory and local shared memory). MRG_SET_PROC_AFF allows a system administrator or an operator to change the MRG affiliations for a process (e.g., changing the inherited or default affiliations of a process). MRG_GET_OBJ_AFF allows a system administrator or an operator to obtain the current affiliations of global shared memory, such as shared text and shared library code. MRG_SET_OBJ_AFF allows a system administrator or an operator to change the global shared memory affiliations (shared text and/or shared library code) as well as re-locate orphaned local shared memory objects from one MRG to another. MRG_NUM_OBJ allows a system administrator or an operator to obtain the number of objects associated with a MRG. The objects returned by MRG_NUM_OBJ are sorted by memory type (e.g., private, local shared, global text, global library code, etc.) and for local shared memory segments, whether they are orphaned.

As can be appreciated from the foregoing, the invention provides various techniques for permitting processes to be partitioned in different MRGs to share local and global shared memory. In combination with the prior art management of private memory partitioning, a complete solution now exists for partitioning memory for all user memory types (private, local shared, and global shared) within the existing MRG infrastructure. No change to the unix semantics is required, thereby rendering the inventive techniques fully backward compatible with existing unix applications. The affiliations created permit full load-balancing capabilities with respect to the processes. Embodiments of the invention permit the sharing to continue even if the process that creates the local shared memory segment detaches or terminates. Furthermore, facilities are provided to allow the system administrator, to assign affiliations, to query for orphaned local shared memory segments, and to load balance by moving local orphaned local memory segments or global shared memory segments among MRGs.

As mentioned, the aforementioned related patent application entitled "MANAGING SHARED MEMORY USAGE WITHIN A MEMORY RESOURCE GROUP INFRASTRUCTURE" is directed toward providing physical memory isolation for shared memory segments. However, there arises a need for an arrangement that also facilitates control of the kernel memory usage. In this manner, a complete memory control solution is provided that enables a system administrator to control the usage of both the kernel memory and the user memory (e.g., private memory, local shared memory, or global shared memory). In the discussion that follows, the concept of memory class is introduced as a mechanism to enable control of both the kernel memory usage and the user memory usage.

Figure 8:
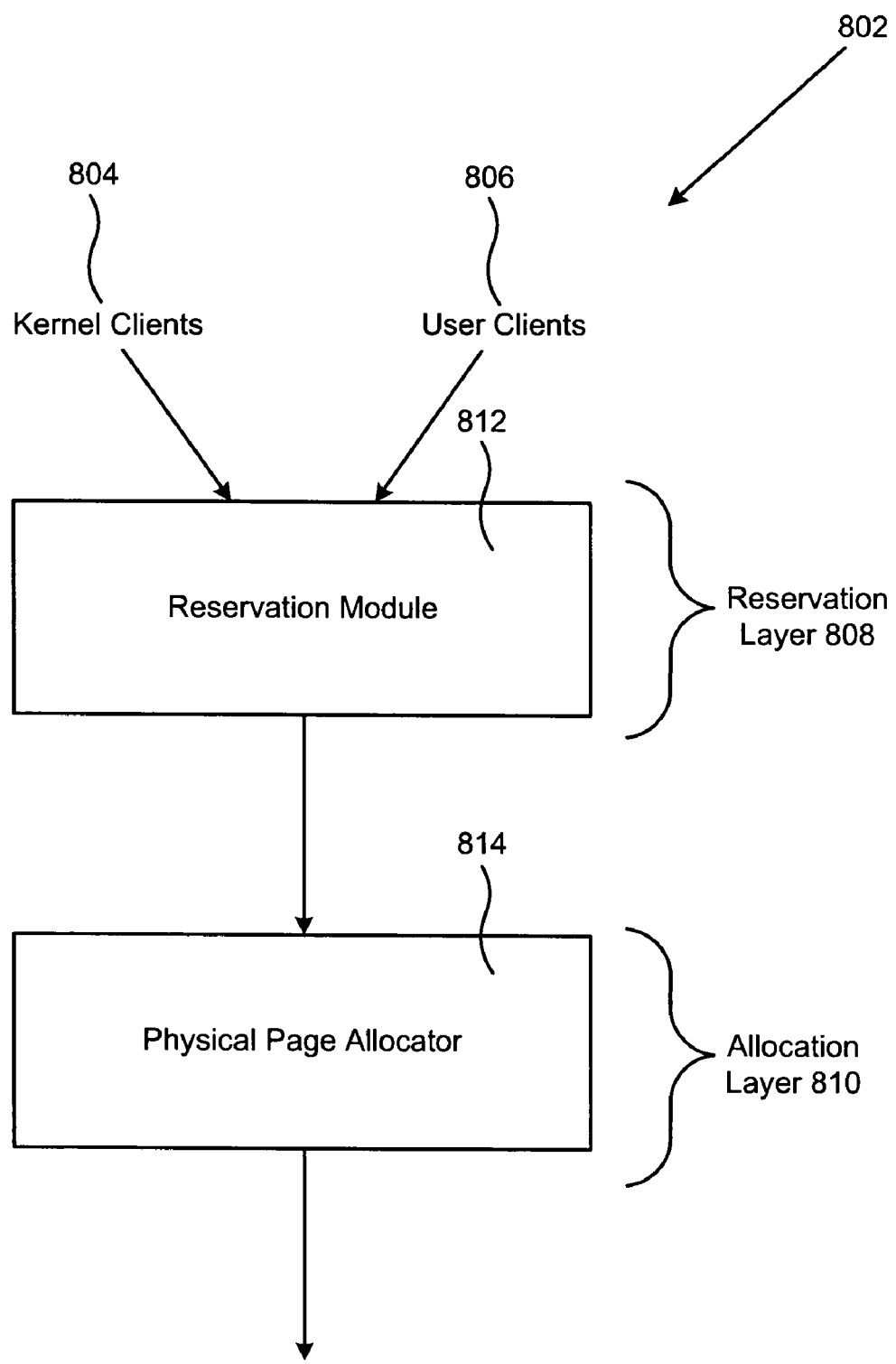
FIG. 8 shows a typical prior art two-stage scheme that allows a client (such as a kernel client or user client) to request and obtain a chunk of memory.

To facilitate discussion of the class concept, some prior art discussion of the typical reservation and allocation scheme may be helpful. FIG. 8 shows a typical prior art two-stage scheme 802 that allows a client (such as one of kernel clients 804 and user clients 806) to request and obtain a chunk of memory. Two-stage scheme 802 includes a common reservation layer 808 and an allocation layer 810. To request and obtain a chunk of memory, a client issues a request to reservation layer 808, which causes reservation module 812 to check and determine whether there is sufficient memory in the system to service the request.

If there is sufficient memory to service the request, the memory is reserved by reservation module 812, and the request is passed to allocation layer 810, thereby causing the physical page allocator 814 to allocate pages of memory from its free lists. On the other hand, if there is insufficient memory to service the request, reservation module 812 may either block the requesting client, which then waits until memory bandwidth is available before allowing reservation and allocation to proceed, or alternatively, reservation module 812 may simply fail the attempt by rejecting the request to obtain memory.

When memory is returned to the system by a client, the memory is first returned to reservation layer 808, which takes note of the return. The returned pages of memory are then placed on the allocator's free lists in allocation layer 810.

Figure 9:
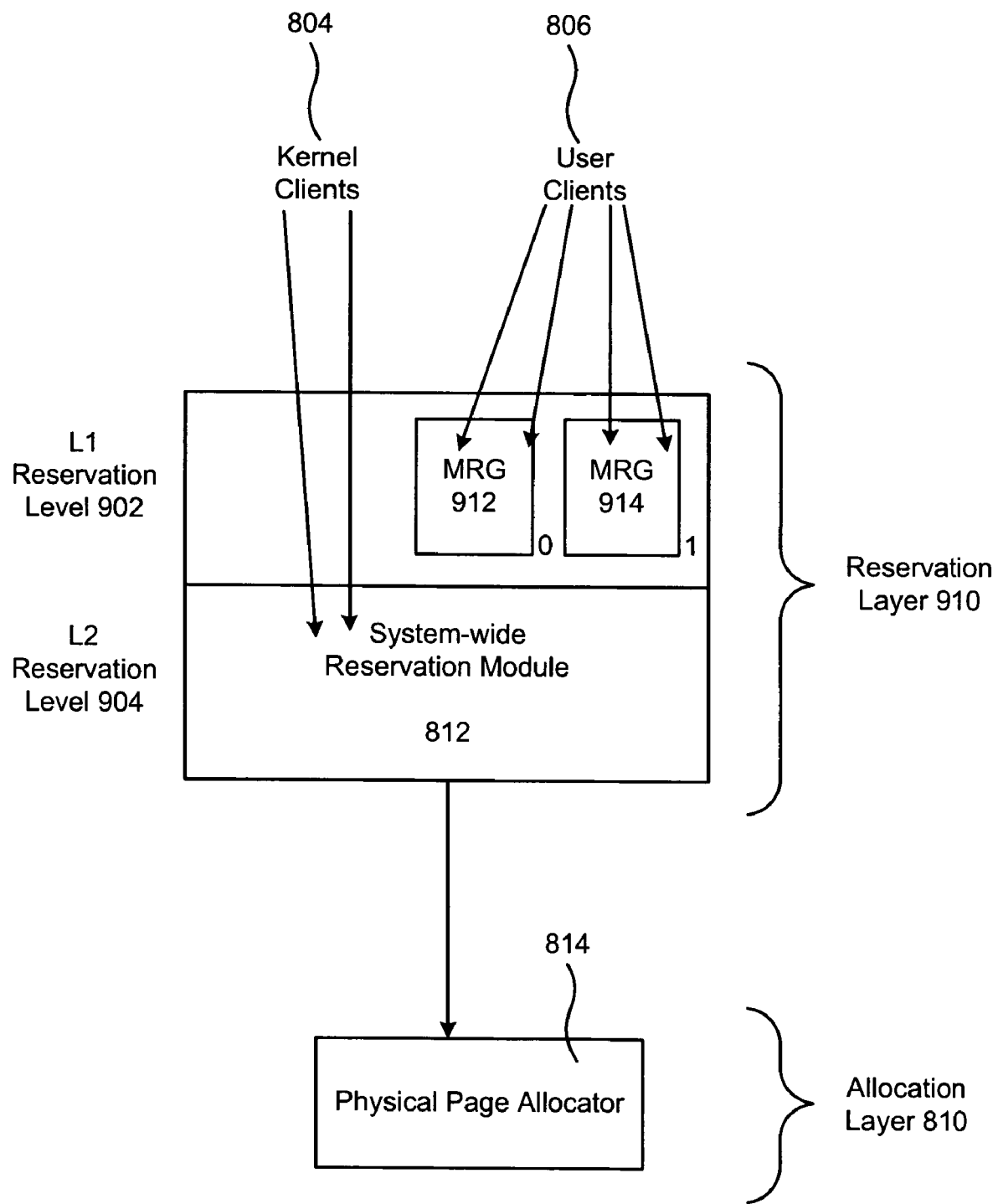
FIG. 9 illustrates the reservation and allocation approach of FIG. 8, albeit now with memory resource groups implemented for the user memory resource types.

As can be appreciated from the discussion of FIG. 8, there is little, if any, arrangement for controlling the physical memory usage among the kernel clients and/or the user clients. FIG. 9 illustrates the same reservation and allocation approach, albeit now with memory resource groups implemented for the user memory resource types in order to control memory usage among the user memory resource types. However, there are no arrangements for controlling kernel memory usage. Accordingly, it is not possible to guarantee physical memory among sub-systems of the kernel. Furthermore, it is not possible to guarantee physical memory to user clients if the kernel happens to require a large amount of memory.

In FIG. 9, the reservation layer 808 of FIG. 8 has been updated to include an L1 reservation level 902 and an L2 reservation level 904. Memory resource group support is implemented in L1 reservation level 902 for user clients 806 as shown. The system-wide reservation module 812, representing the module for reserving memory in response to requests from kernel clients 804 and user clients 806 is implemented in L2 reservation level 904. Together, L1 reservation level 902 and an L2 reservation level 904 comprise a reservation layer 910.

A request from one of the user clients 806 would be received by one of memory resource groups 912 or memory resource group 914 in L1 reservation level 902, depending on the source of the request. L1 reservation level 902 checks the memory availability of the memory resource group to ascertain whether there is sufficient memory within the memory resource group with which the originator of the request is affiliated. If there is sufficient memory to service the request within the affiliated memory resource group, the request is passed onto L2 reservation level 904 wherein the request is serviced by the system-wide reservation module 812 (and subsequently by allocator 814 if memory is available in the system) in the manner described in connection with FIG. 8.

On the other hand, if there is insufficient memory to service the request within the affiliated memory resource group, the request is denied at L1 reservation level 902, and there is no need to forward the request on to reservation module 812 in L2 reservation layer 904.

Memory requests from kernel clients 804, on the other hand, does not have memory resource group support. Accordingly, a memory request from one of kernel clients 804 is passed directly to reservation module 812 in the manner described in connection with FIG. 8. As such, it is possible for kernel clients 804 to starve out user clients 806 even though there is memory resource group support in user clients 806, such as in the case there is an overlap in memory mapping for the kernel clients and the user clients. Furthermore, it is possible for a kernel client to starve out other kernel clients. As is evident, an arrangement for controlling memory usage by kernel clients is needed.

Figure 10:
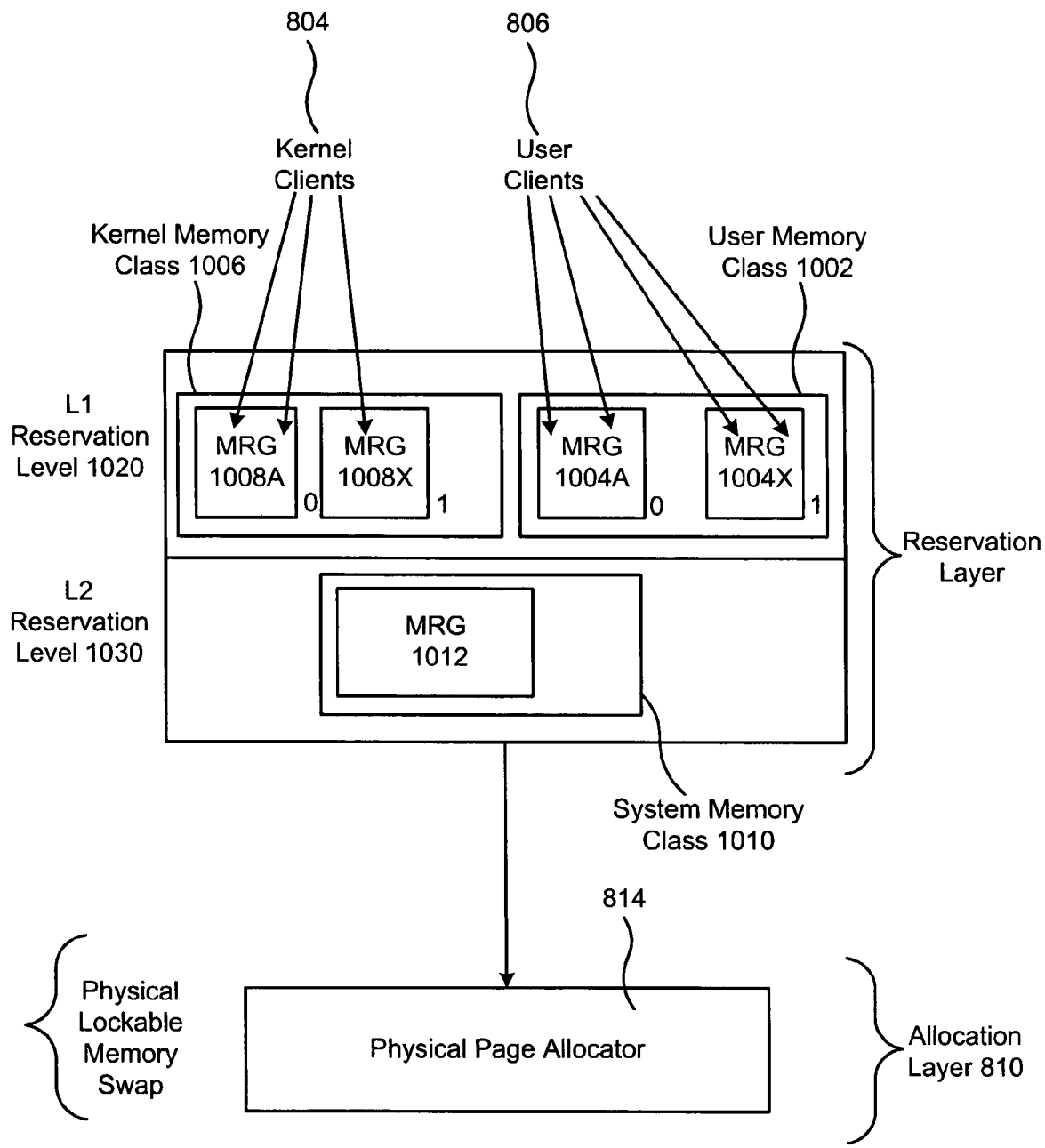
FIG. 10 shows, in accordance with an embodiment of the present invention, an arrangement for controlling memory for all memory types, including kernel memory and user memory.

FIG. 10 shows, in accordance with an embodiment of the present invention, an arrangement for controlling memory for all memory types, including kernel memory and user memory. Instead of simply extending the memory resource group feature to kernel clients, there is provided an innovative class structure that is at a higher level of abstraction than the memory resource group structure. Furthermore, the class structure is implemented not only for the kernel clients and the user clients at L1 reservation level 902 but also for the system-wide reservation module at the L2 reservation level 904. Accordingly, the arrangements in these two reservation levels are kept uniform, which greatly assist in the creation and maintenance of the entities in these two reservation levels.

Referring now to FIG. 10, there is shown a user memory class 1002, which serves as a logical container construct for a plurality of memory resource groups 1004A-1004X. As mentioned, there may be as many memory resource groups as desired. Each of user clients 806 is affiliated with one of the memory resource groups 1004A-1004X. There is always at least a default memory resource group 1004A in user memory class 1002. Other memory resource groups for user clients 806 may be created over time.

There is also shown a kernel memory class 1006, which serves as a logical container construct for a plurality of memory resource groups 1008A-1008X. There may be as many memory resource groups as desired. Each of kernel clients 804 is affiliated with one of the memory resource groups 1008A-1008X. There is always at least a default memory resource group 1008A in kernel memory class 1006. Other memory resource groups for kernel clients 804 may be created over time.

There is also shown a system memory class 1010, which serves as a logical container construct for a system memory group 1012. There may be as many memory resource groups as desired in system memory class 1010. One application of an additional memory resource group in system memory class 1010 to facilitate hot addition and hot removal of memory from the computer system. There is always at least a default memory resource group 1012 in system memory class 1010. Other memory resource groups for system memory class 1010 may be created over time.

In the implementation of FIG. 10, a request from one of user clients 806 is first received by its affiliated memory resource group in L1 reservation level 1020. If there is sufficient memory in the affiliated memory resource group at the L1 reservation level 1020, the request is passed on system memory resource group 1012 to ascertain whether there is sufficient physical memory in the system to accommodate the request. If there is sufficient memory in the system memory resource group 1012 at the L2 reservation level 1030, the request is passed on to allocation layer 814 and processed in the manner discussed earlier in connection with FIG. 8.

On the other hand, if it is discovered at L1 reservation level 1020 that there is insufficient memory in the affiliated memory resource group at the L1 reservation level 1020, the request from the user client is denied and there is no need to pass the failed request on to L2 reservation level 1030. If there is an overlap in memory mapping between user memory and kernel memory, it is possible to pass the L1 reservation check (at one of the memory resource groups) and still fails at the L2 reservation check (e.g., at memory resource group 1012). In that case, the request does not need to be passed on to allocator 814 for memory allocation.

Kernel requests are handled similarly except that they are processed in their kernel memory class 1006 against their kernel memory resource groups 1008A-1008X before being processed by a system memory group (e.g., system memory group 1012) in system memory class 1010.

By providing the class structure at all levels of the reservation mechanism, it is possible to use the same code to create, configure, and query the various classes. Further, since the structure is uniform in that a class acts as a logical container for its memory resource groups, it is possible to use the same code to create, configure, and query the various memory resource groups therein. Each memory resource group may be uniquely referred to by identifying its class ID and its memory resource group ID. The same import/export mechanism described earlier continues to work for the memory resource groups irrespective of which class it belongs to. In an embodiment, importing and/or exporting memory by a memory resource group is confined to other memory resource groups within the same class.

The class/memory resource group arrangement offers many advantages and features. For example, by limiting the size of the class (e.g., kernel memory class 11006), it is possible to protect the kernel clients and/or the user clients across classes. This is unlike the previous situation wherein it is not possible to protect the user clients against encroaching memory usage by the kernel clients. Further, by appropriately sizing the various memory resource groups within the kernel memory class, it is possible to protect the various kernel clients from encroaching memory use by another kernel client. Again, this is unlike the previous situation wherein it is not possible to protect any kernel client against encroaching memory usage by any other kernel client.

As will be discussed later herein, it is possible to map the kernel memory and the user memory such that they can either not overlap or may overlap by a certain amount. In doing so, it is possible to tailor the protection such that a client (whether a kernel client or a user client) may be either absolutely protected with respect to its minimum amount of physical memory or may be unprotected with respect to any amount of physical memory, or any degree of protection in the continuum between these two extremes.

Figure 11:
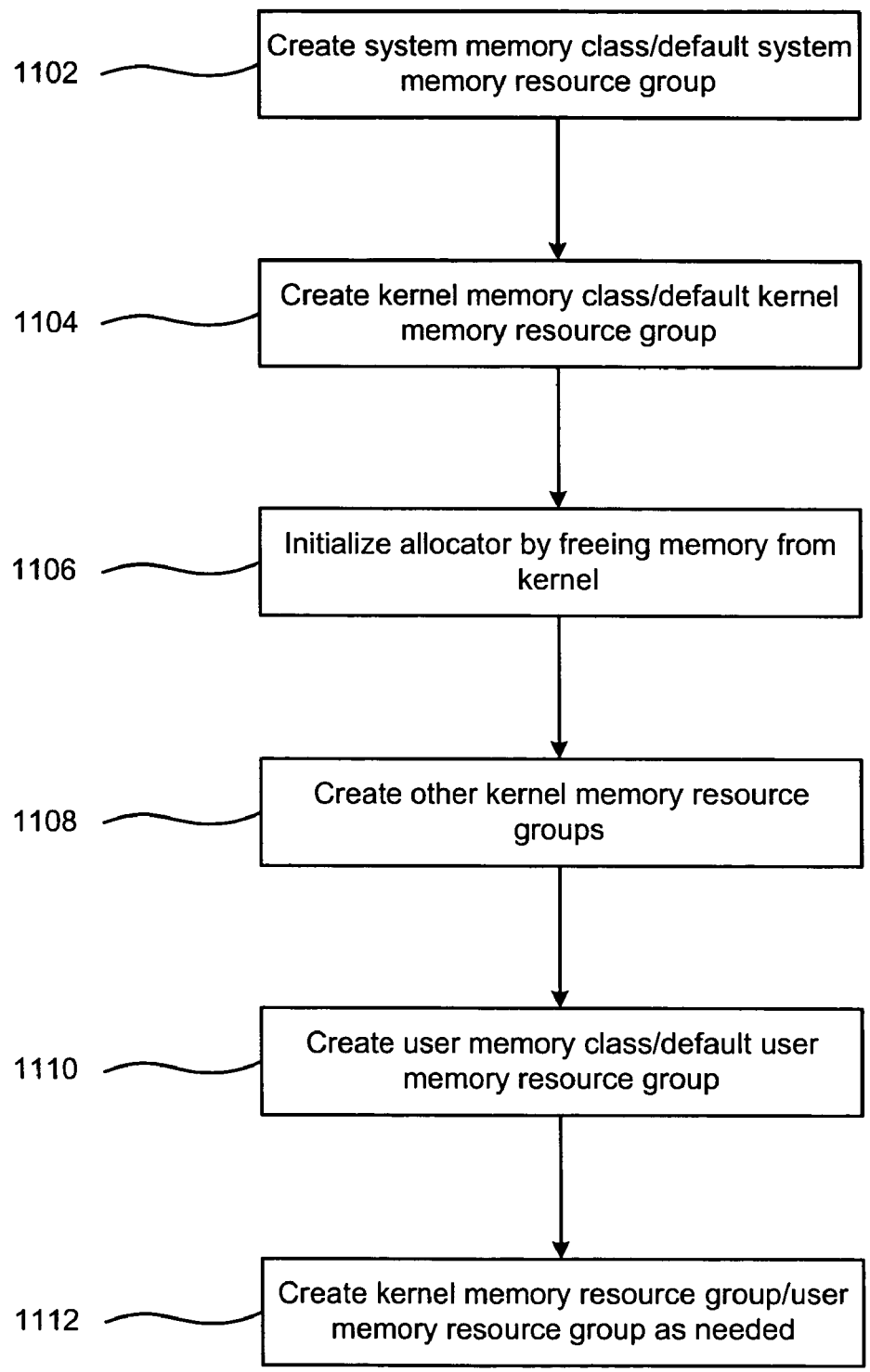
FIG. 11 shows, in accordance with an embodiment of the present invention, the steps for booting up a computer system that implements the class structure.

FIG. 11 shows, in accordance with an embodiment of the present invention, the steps for booting up a computer system that implements the class structure. Since it is not possible to know in advance how much free memory would be available in the kernel memory class, an innovative inverted boot-up procedure is provided in an embodiment. The assumption is that upon starting up, all memory is consumed by the kernel, and the kernel returns unused memory to provision other classes and memory resource groups. This is different from the conventional startup procedure whereby all memory is assumed to be free upon startup.

In step 1102, the system memory class, such as system memory class 1010 is created. At this point, the size of the system memory class is set to be equal to the total physical memory on the system. Furthermore, the default system memory resource group (e.g., system memory resource group 1012) is created. The default system memory resource group is set to be equal to the system class size, i.e., the total physical memory on the system. The amount of free memory in the default system memory resource group is zero at this point.

In step 1104, the kernel memory class, such as kernel memory class 1006, is created. At this point, the size of the kernel memory class is set to be equal to the total physical memory on the system. Furthermore, the default kernel memory resource group (e.g., kernel memory resource group 1008A) is created. The default kernel memory resource group is set to be equal to the kernel class size, i.e., the total physical memory on the system. The amount of free memory in the default kernel memory resource group is zero at this point.

In step 1106, the physical memory allocator (e.g., allocator 814) is initialized by freeing free kernel memory into it. Thus, the kernel is asked to return free memory by first returning such free memory into the default kernel memory resource group (e.g., kernel memory resource group 1008A), which is then returned in a cascaded fashion into the default system memory resource group (e.g., system memory resource group 1012), which is then returned in a cascaded fashion into the physical memory allocator. Thus, pages in the free list in the physical memory allocator are filled with memory freed from the kernel. At this point, there exists free memory in the default kernel memory resource group and the default system memory resource group.

In step 1108, any other required kernel memory resource groups will be created in the kernel memory class. These additional kernel memory resource groups may be employed to, for example, control memory usage by various kernel subsystems. For example, kernel memory resource groups may be created for one or more kernel clients associated with the file cache subsystem, one or more kernel clients associated with the networking subsystem, and the like. The memory required to create these additional kernel memory resource groups are carved out from the default kernel memory resource groups (e.g., kernel memory resource group 1008A). Note that such creation does not affect the amount of free memory available in the system memory class.

step 1110, the user memory class is created from the free memory left over, as ascertained from the system memory class. The size of the user memory class is set to be equal to the amount of free memory currently available in the system memory class. Furthermore, the default user memory resource group (such as user memory resource group 1004A) is created. At this point, the default user memory resource group is set to be equal to the user memory class size, i.e., the amount of free memory currently available in the system memory class. At this point, booting is substantially completed for the class/memory resource group structure.

In step 1112, additional kernel and/or user memory resource groups are created as required by carving out memory from their respective default memory resource groups.

Figure 12A:
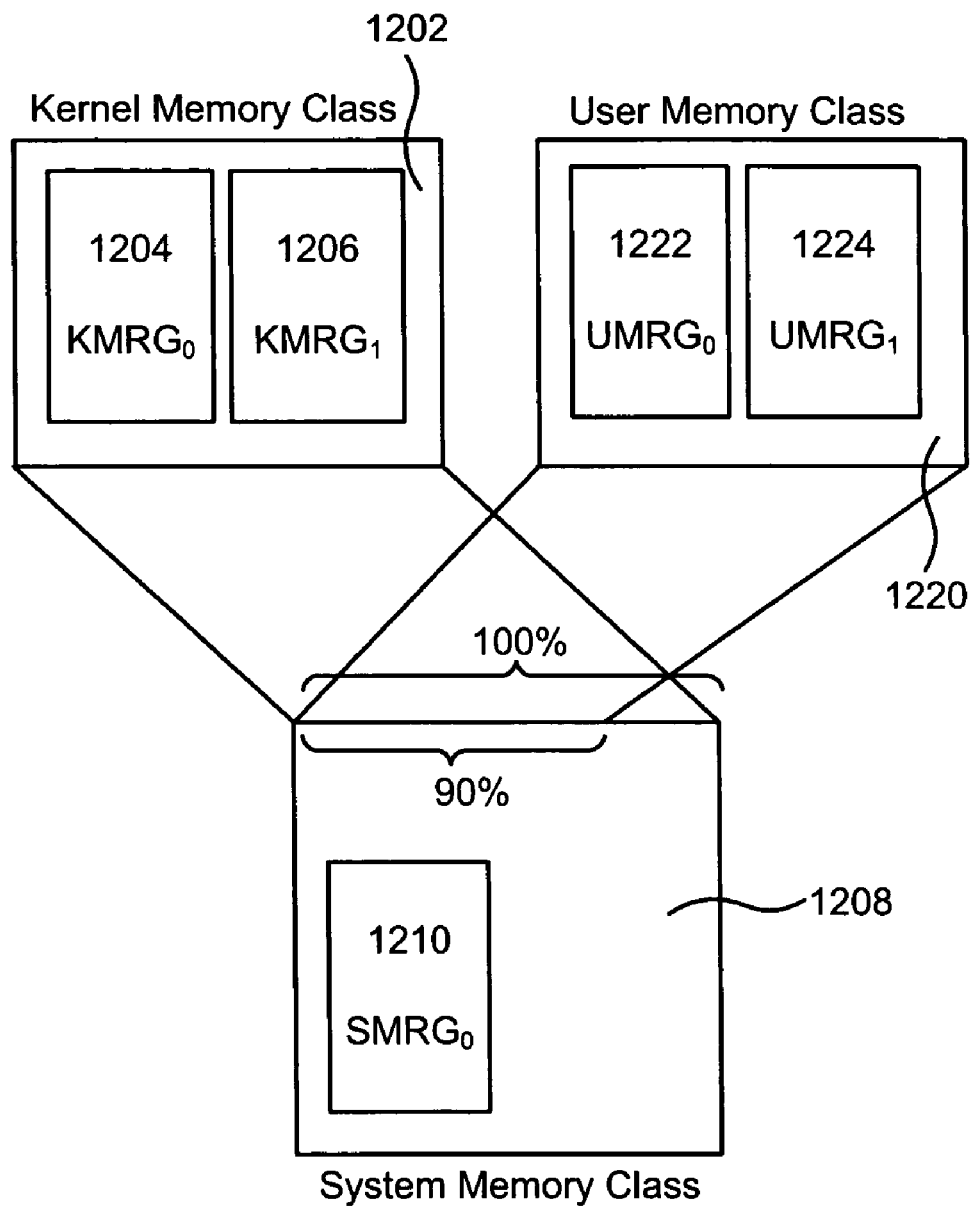
FIG. 12A shows, in accordance with an embodiment of the present invention, an example wherein there is overlap in the memory allocation for the kernel clients and user clients.
Figure 12B:
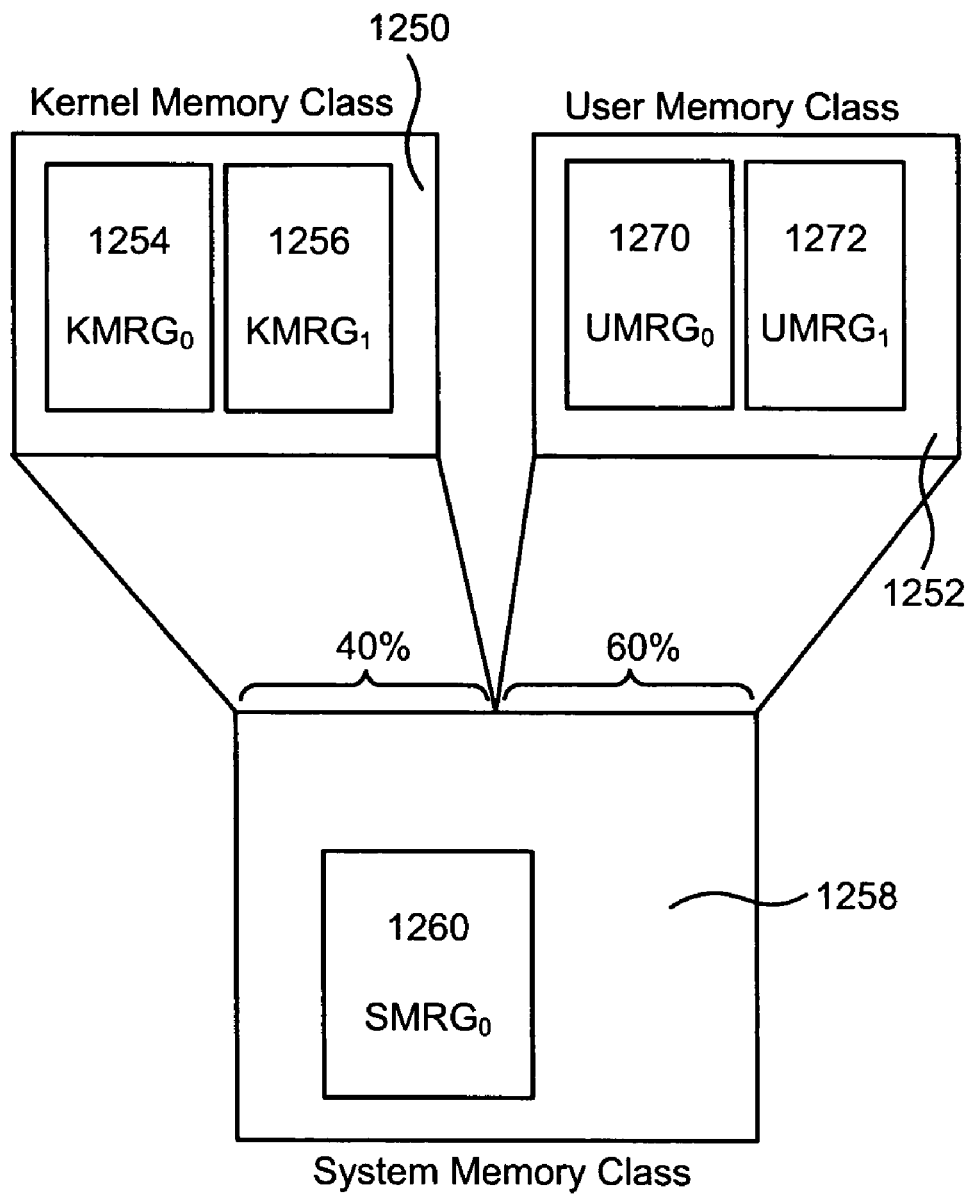
FIG. 12B shows, in accordance with an embodiment of the present invention, an example wherein there is no overlap in the memory allocation for the kernel clients and user clients.

FIGS. 12A and 12B illustrate, in accordance with embodiments of the present invention, how the class structure may be employed to manage physical memory sharing between kernel clients and user clients. In FIG. 12A, there is an overlap in the memory allocation for the kernel clients and user clients. Thus a kernel memory class 1202 having two example kernel memory resource groups 1204 and 1206 is mapped into 100% of a system memory class 1208. System memory class 1208 is shown having a system memory resource group 1210 and represents the available physical memory of the system.

On the other hand, user memory class 1220, which has two example user memory resource groups 1222 and 1224, is mapped into only 90% of system memory class 1208. Due to the overlap (as evidenced by the fact that the sum of the allocations is greater than 100%) and the fact that kernel memory class 1202 is mapped onto 100% of system memory, the user clients affiliated with user memory resource groups 1222 and 1224 are not protected from encroaching memory usage by the kernel clients. Note that this is true even though the user clients are protected from memory encroachment by other user clients due to the implementation of the user memory resource groups. Further, due to the implementation of the kernel memory resource groups (e.g., 1204 and 1206), the kernel clients are protected from encroaching use by other kernel clients. However, they are not protected from encroaching memory usage from user clients.

FIG. 12B shows a non-overlapping memory allocation between a kernel memory class 1250 and a user memory class 1252, thereby protecting the kernel clients and the user clients across memory resource groups and across classes. In this case kernel memory class 1250, which has two example kernel memory resource groups 1254 and 1256, is mapped onto 40% of a system memory class 1258. As shown in FIG. 12B, system memory class 1258 has an example system memory resource group 1260. User memory class 1252, which has two example user memory resource groups 1270 and 1272, is mapped onto the other 60% of system memory class 1258. Accordingly, if a kernel client requests a large amount of memory, the amount of memory allowed is limited first by the size of its affiliated kernel memory resource group. Next, the size of the kernel memory class serves as the upper limit for the total memory allocation of all kernel clients belonging to all of the existing kernel memory resource groups. In this manner, unless the mapping is changed, the kernel is limited to 40% of the system memory, ensuring that the user clients will not be starved due to the kernel's encroaching memory use. Conversely, the user clients are limited to 60% of the system memory, thereby protecting the kernel clients.

As can be seen, the mapping of FIG. 12B provides full protection across classes, whereas the mapping of FIG. 12A provides no protection for the user clients but some protection (up to a maximum of 10% of physical memory) for kernel clients. The system administrator can choose any level of over-lapping to achieve the desired degree of protection for the user clients and/or kernel clients.

As mentioned, there is a default memory resource group for each memory class. When a new memory resource group is created, memory is carved out from this default memory group to instantiate the new group. When an existing memory resource group is removed, memory is returned to the default memory resource group of the respective memory class. In accordance with an embodiment, the normal mechanism for adding and removing a memory resource group is bypassed in order to facilitate hot addition and hot removal of memory.

Figure 13:
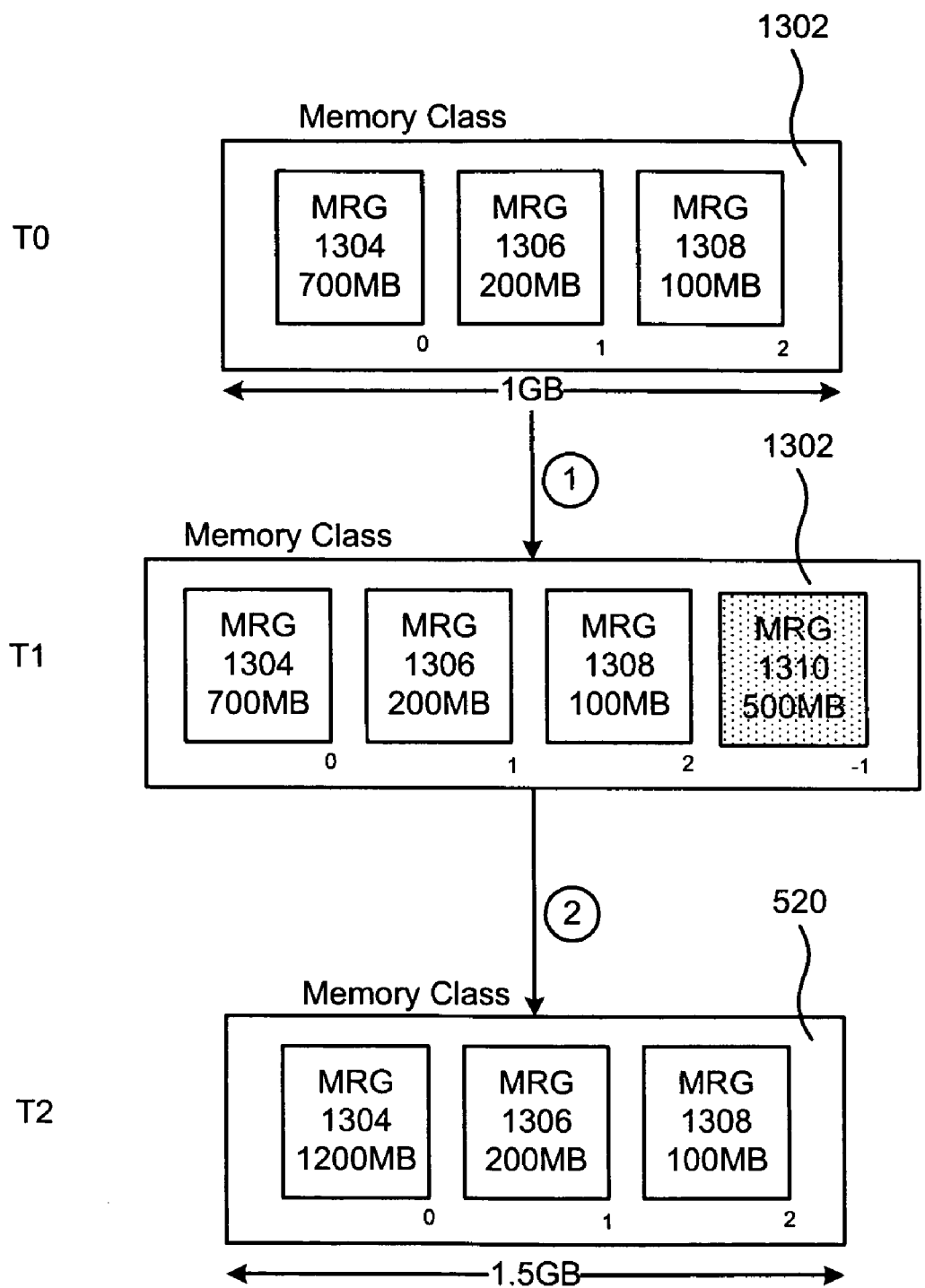
FIG. 13 shows, in accordance with an embodiment of the present invention, an example wherein hot addition of memory is performed.

To facilitate discussion, FIG. 13 shows an example of a memory class (e.g., one of a system memory class, a kernel memory class, and a user memory class) in which the normal mechanism for adding a memory resource group has been bypassed in order to facilitate the hot addition of 500 MB of memory. To clarify, hot addition and hot removal refers to the addition and removal of physical memory without shutting down the operating system and going through a normal boot cycle. The addition and removal of memory may refer to actual physical insertion and removal of a memory device from the computer system, the process of making more or less physical memory visible to the operations system, such as the case with ICOD (Instant Capacity on Demand) systems or the transfer of physical memory from one operating system to another on systems that support virtual machines (multiple operating system instances running simultaneously on the same computer system).

At time T0, a memory class 1302 is shown having three example memory resource groups 1304 (700 MB), 1306 (200 MB) and 1308 (100 MB), of which memory resource group 1304 is the default memory resource group. Suppose the system administrator wishes to perform a hot addition of 500 MB of memory into this memory class, i.e., increase the default memory resource group 1304 by 500 MB without having to reboot the operating system. The operation to accomplish the hot addition of memory involves two steps. At time T1, a temporary memory resource group 1310 of 500 MB is added without using the normal mechanism for creating an additional 500 MB resource memory group to memory class 1302. That is, temporary memory resource group 1310 of 500 MB is added without carving out 500 MB of memory from the existing default resource group.

At time T1, the normal procedure for removing a memory resource group is applied to the newly added temporary memory resource group 1310. In this case, the normal memory resource group removal procedure, when applied to memory resource group 1310, causes 500 MB of memory to be "returned" to the default memory resource group 1304. The result is shown at time T2, at which time the default memory resource group 1304 is shown to have a total of 700 MB+500 MB of memory or a total of 1,200 MB.

In an embodiment, the temporarily added memory resource group (e.g., memory resource group 1310) is identified with a special ID to ensure that no process will attempt to be affiliated with the temporary memory resource group before it is "removed." For example, the temporary memory resource group may be given an ID number of −1.

In an example implementation, memory is first added to the allocator and then to the system memory class using the technique discussed in connection with FIG. 13 above. After the memory is added, the system administrator may specify that some or all of the additional memory be added to one or both of the kernel memory class and the user memory class.

In an embodiment, all of the above mentioned tasks of adding physical memory to a memory class is accomplished by using the grow option of a primitive MEM_CLASS_SET_ATTR.

Figure 14:
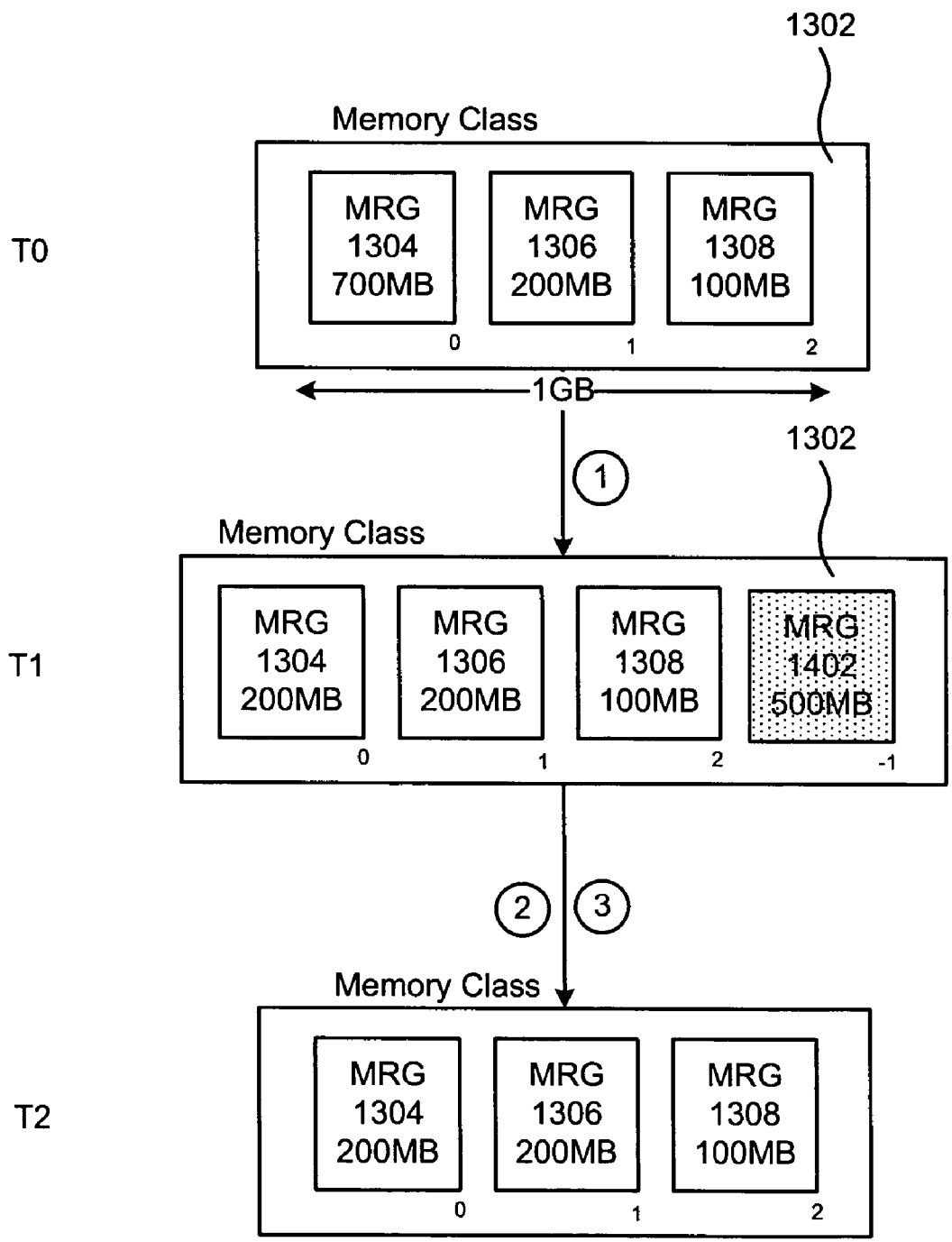
FIG. 14 shows, in accordance with an embodiment of the present invention, an example wherein hot removal of memory is performed.

The hot removal of memory may be accomplished in an analogous manner. With reference to FIG. 14, at time T0, memory class 1302 is shown again having three memory resource groups 1304 (700 MB), 1306 (200 MB) and 1308 (100 MB), of which memory resource group 1304 is the default memory resource group. At time T1, a temporary memory resource group of 500 MB is created using the normal memory resource group addition mechanism. This causes the memory resource group 1402 to be created, which carves out 500 MB from default memory resource group 1304. Accordingly, memory resource group 1304 is shown having only 700 MB−500 MB or 200 MB remaining.

At time T2, the temporary memory resource group 1402 is removed without employing the normal memory resource group removal procedure. This is because the normal memory resource group removal procedure causes the memory resource group to be deleted but its memory returned to the default memory group 1304. By removing the temporary memory resource group 1402 without using the normal memory resource group removal procedure, the 500 MB of memory may be removed from class 1302 without causing the 500 MB to be added back to the default memory resource group.

Similar to the situation of FIG. 13, the temporarily created memory resource group (e.g., memory resource group 1402) is identified with a special ID to ensure that no process will attempt to be affiliated with the temporary memory resource group before it is "removed." For example, the temporary memory resource group may be given an ID number of −1.

In an example implementation, memory is first removed from either the kernel memory class or the user memory class, or both, using the technique discussed in connection with FIG. 14 above. In the next step the physical memory is also removed from system memory class. Thereafter, this memory may, if desired, be removed from the allocator.

In an embodiment, all of the above mentioned tasks for removing physical memory from a memory class is accomplished using the shrink option of a primitive MEM_CLASS_SET_ATTR.

Figure 15:
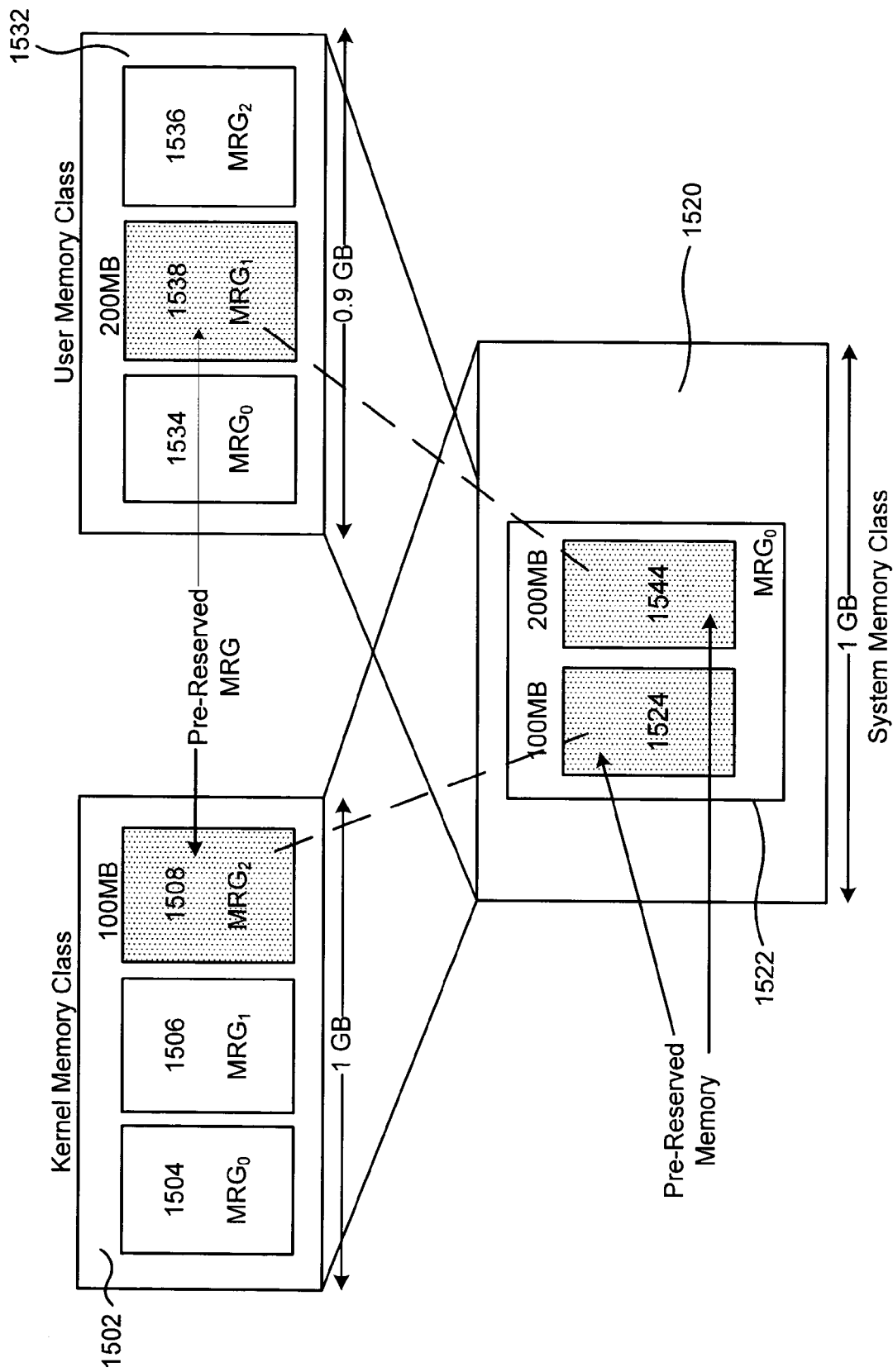
FIG. 15 shows, in accordance with an embodiment of the present invention, an arrangement for protection of clients across classes by pre-reserving memory.

As shown earlier in FIG. 12B, protection of either the user clients or the kernel clients from other clients is possible, even across classes, if the classes are mapped in a non-overlapping manner with the system memory class. FIG. 15 shows, in accordance with an embodiment of the present invention, an arrangement for protection of clients across classes even when the memory mapping by the various classes to the system memory class is overlapping. For example, a file cache (a kernel client) may be implemented with a minimal cache size of 100 MB and a maximum cache size of 600 MB. In this case, a minimum of 100 MB needs to be protected from encroaching memory usage by user clients.

FIG. 15 introduces the concept of pre-reserving memory in the system memory class. In FIG. 15, a kernel memory class 1502 is shown having three example kernel memory resource groups 1504, 1506 and 1508, of which memory resource group 1504 is the default kernel memory resource group. Further, suppose that kernel memory resource group 1508 needs to have a minimum of 100 MB of memory at all times. In an embodiment, when kernel memory resource group 1508 is created, it is tagged as a pre-reserved kernel memory resource group. The "pre-reserved" designation signifies that the required guaranteed amount of memory for that kernel memory resource group 1508 has been accounted for in (or blocked from) system memory resource class 1520, and more particularly in a system memory resource group 1522. This pre-reserved block of memory is shown by pre-reserved memory block 1524.

The same pre-reserved concept may also apply to a user memory resource group that needs the same degree of protection. In FIG. 15, a user memory class 1532 is shown having three example user memory resource groups 1534, 1536 and 1538, of which user memory resource group 1534 is the default user memory resource group. Further, suppose that user memory resource group 1538 needs to have a minimum of 200 MB of memory at all times. In an embodiment, when user memory resource group 1538 is created, it is tagged as a pre-reserved user memory resource group. The "pre-reserved" designation signifies that the required guaranteed amount of memory for that user memory resource group 1538 has been accounted for in (or blocked from) system memory resource class 1520, and more particularly in a system memory resource group 1522. This pre-reserved block of memory is shown by pre-reserved memory block 1544.

In an embodiment, when a memory resource group (e.g., memory resource group 1508) is designated a pre-reserved memory resource group, a request for memory by a client associated with that memory resource group will require that there is sufficient memory in that pre-reserved memory resource group to service the memory request. If there is sufficient memory in that pre-reserved memory resource group to service the memory request, there is no need to check further in the system memory class because by definition, memory for that entire affiliated memory resource group has already been pre-reserved for use in the system memory class.

While this invention has been described in terms of several embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for allocating memory in a computer system in which memory for a given process is allocated by first reserving at a reservation layer and then allocating at an allocation layer in an operating system, comprising:

creating a kernel memory class, said kernel memory class being part of said reservation layer and acting as a logical container for at least a first kernel memory resource group;

processing, as part of a reservation process at said reservation layer, a request of a kernel client for additional memory by ascertaining whether there is sufficient free memory in said first kernel memory resource group to accommodate said request, wherein said kernel client is affiliated with said first kernel memory resource group in said kernel memory class, wherein said kernel memory class provides an upper limit for total memory allocation of all kernel clients affiliated with any kernel memory resource group in said kernel memory class; and denying, as part of said reservation process, said request if there is insufficient free memory in said first kernel memory resource group to accommodate said request.

2. The method of claim 1 further comprising:

creating a system memory class, said system memory class acting as a logical container for at least a first system memory resource group;

if there is sufficient free memory in said first kernel memory resource group to accommodate said request of said kernel client, processing said request by ascertaining whether there is sufficient free memory in said first system memory resource group to accommodate said request; and denying said request if there is insufficient free memory in said first system memory resource group to accommodate said request.

3. The method of claim 1, wherein the kernel memory resource group determines a limitation on an amount of memory that can be requested by the kernel client that is affiliated with the kernel memory resource group.

4. A computer system comprising:

a memory;

a reservation layer to reserve the memory; and an allocation layer in an operating system to allocate a portion of the memory;

wherein the reservation layer has a first reservation level and a second reservation level, said first reservation level including:

a kernel memory class, said kernel memory class being mapped to at least a first portion of physical memory in said computer system, said kernel memory class acting as a logical container that contains kernel memory resource groups that are affiliated with kernel clients, wherein said kernel memory class determines an upper limit for total memory allocation of all kernel clients that are affiliated with any kernel memory resource group in said kernel memory class; and a user memory class, said user memory class being mapped to at least a second portion of physical memory in said computer system, said user memory class acting as a logical container that contains at least a first user memory resource group that is affiliated with a user client, wherein said user memory class determines an upper limit for total memory allocation of all user clients that are affiliated with any user memory resource group in said user memory class.

5. The computer system of claim 4 wherein said second reservation level includes a system memory class, said system memory class acting as a logical container that contains at least a first system memory resource group.

6. The computer system of claim 5 wherein said system memory class contains said physical memory.

7. The computer system of claim 4 wherein said user memory class and said kernel memory class are overlapping.

8. The computer system of claim 4 wherein said user memory class and said kernel memory class are non-overlapping.

9. The computer system of claim 4, wherein each of the kernel memory resource groups is a logical block of the memory, and wherein memory utilization by one of the kernel clients affiliated with one of the kernel memory resource groups does not impact memory utilization in another one of the kernel memory resource groups.

10. A method for guaranteeing a minimum amount of physical memory to a user client, said physical memory for a given process being allocated by first reserving at a reservation layer and then allocating at an allocation layer in an operating system, comprising:
   affiliating said user client with a user memory resource group, said user memory resource group being associated with a user memory class, wherein said user memory class acts as a logical container that contains at least said user memory group, and wherein said user memory class provides an upper limit for total memory allocation of all user clients affiliated with any user memory resource group in said user memory class, a size of said user memory resource group being set to be at least a size of said minimum amount of physical memory; and
   pre-reserving, prior to allocating, a chunk of memory associated with a system memory resource group, said chunk of memory having at least said size of said minimum amount of physical memory, said system memory resource group being part of a system memory class.

11. The method of claim 10, wherein the user memory resource group determines a limitation on an amount of memory that can be requested by the user client that is affiliated with the user memory resource group.

12. A method for guaranteeing a minimum amount of physical memory to a kernel client, said physical memory for a given process being allocated by first reserving at a reservation layer and then allocating at an allocation layer in an operating system, comprising:
   affiliating said kernel client with a kernel memory resource group, said kernel memory resource group being associated with a kernel memory class, wherein said kernel memory class acts as a logical container that contains at least said kernel memory group, and wherein said kernel memory class provides an upper limit for total memory allocation of all kernel clients affiliated with any kernel memory resource group in said kernel memory class, a size of said kernel memory resource group being set to be at least a size of said minimum amount of physical memory; and
   pre-reserving a chunk of memory associated with a system memory resource group, said chunk of memory having at least said size of said minimum amount of physical memory, said system memory resource group being part of a system memory class.

13. The method of claim 12, wherein the kernel memory resource group determines a limitation on an amount of memory that can be requested by the kernel client that is affiliated with the kernel memory resource group.

14. A method for rendering an additional amount of physical memory available for use by an operating system, comprising:
   adding said additional amount of physical memory to a memory class of said operating system, said additional amount of physical memory being added using a temporary memory resource group having a size that is at least equal to a size of said additional amount of physical memory to be added, said adding being performed without taking memory from a default memory resource group of said memory class, said temporary memory resource group being added to the memory class, said memory class provides an upper limit for total memory allocation of all clients affiliated with any memory resource group in said memory class; and
   deleting said temporary memory resource group, thereby causing said additional amount of physical memory to be added to said default memory resource group.

15. The method of claim 14 wherein said memory class represents a system memory class, said memory resource group representing a system memory resource group, and said default memory resource group representing a default system memory resource group.

16. The method of claim 14 wherein said memory class represents a kernel memory class, said memory resource group representing a kernel memory resource group, and said default memory resource group representing a default kernel memory resource group.

17. The method of claim 16, wherein the kernel memory resource group determines a limitation on an amount of memory that can be requested by a kernel client that is affiliated with the kernel memory resource group.

18. The method of claim 16, wherein the kernel memory class determines an upper limit for total memory allocation of all kernel clients that are affiliated with any kernel memory resource group in the kernel memory class.

19. The method of claim 14 wherein said memory class represents a user memory class, said memory resource group representing a user memory resource group, and said default memory resource group representing a default user memory resource group.

20. The method of claim 19, wherein the user memory resource group determines a limitation on an amount of memory that can be requested by a user client that is affiliated with the user memory resource group.

21. The method of claim 19, wherein the user memory class determines an upper limit for total memory allocation of all user clients that are affiliated with any user memory resource group in the user memory class.

22. The method of claim 14 wherein said temporary memory resource group is associated with an ID that is not used by clients associated with said memory class.

23. The method of claim 22, wherein the ID prevents the clients to affiliate with the temporary memory resource group.

24. The method of claim 14, wherein adding the additional amount of physical memory comprises hot adding the additional amount of physical memory into the computer system, wherein hot adding is accomplished by physically inserting the additional amount of the physical memory.

25. A method for removing an amount of physical memory available for use by an operating system, comprising:

creating a temporary memory resource group in a memory class wherein said memory class acts as a logical container for at least a memory resource group, said memory class provides an upper limit for total memory allocation of all clients affiliated with any memory resource group in said memory class, said temporary memory resource group having a size that is at least equal to a size of said amount of physical memory to be removed, said creating causing a chunk of memory that is at least equal to said size of said amount of physical memory to be removed to be taken from a default memory resource group of said memory class;

deleting said temporary memory resource group, thereby causing said amount of physical memory to be removed from said memory class.

26. The method of claim 25 wherein said memory class represents a system memory class, said memory resource group representing a system memory resource group, and said default memory resource group representing a default system memory resource group.

27. The method of claim 25 wherein said memory class represents a kernel memory class, said memory resource group representing a kernel memory resource group, and said default memory resource group representing a default kernel memory resource group.

28. The method of claim 27, wherein the kernel memory resource group determines a limitation on an amount of memory that can be requested by a kernel client that is affiliated with the kernel memory resource group.

29. The method of claim 27, wherein the kernel memory class determines an upper limit for total memory allocation of all kernel clients that are affiliated with any kernel memory resource group in the kernel memory class.

30. The method of claim 25 wherein said memory class represents a user memory class, said memory resource group representing a user memory resource group, and said default memory resource group representing a default user memory resource group.

31. The method of claim 30, wherein the user memory resource group determines a limitation on an amount of memory that can be requested by a user client that is affiliated with the user memory resource group.

32. The method of claim 30, wherein the user memory class determines an upper limit for total memory allocation of all user clients that are affiliated with any user memory resource group in the user memory class.

33. The method of claim 25 wherein said temporary memory resource group is associated with an ID that is not used by clients associated with said memory class.

34. The method of claim 33, wherein the ID prevents the clients to affiliate with the temporary memory resource group.

35. The method of claim 25, wherein removing the amount of physical memory comprises hot removing the amount of physical memory from the computer system, wherein hot removing is accomplished by physically removing the amount of the physical memory.

36. An article of manufacture comprising a program storage medium having computer readable code embodied therein, said computer readable code being configured to allocate memory in a computer system in which memory for a given process is allocated by first reserving at a reservation layer and then allocating at an allocation layer in an operating system, comprising:

computer readable code for processing, as part of a reservation process at said reservation layer, a request of a kernel client for additional memory by ascertaining whether there is sufficient free memory in a first kernel memory resource group to accommodate said request, said first kernel memory resource group being part of a kernel memory class, wherein said kernel memory class acts as a logical container that contains at least said first kernel memory resource group, and wherein said kernel client is affiliated with said first kernel memory resource group in said kernel memory class, wherein said kernel memory class provides an upper limit for total memory allocation of all kernel clients affiliated with any of multiple kernel memory resource groups in said kernel memory class; and computer readable code for denying, as part of said reservation process, said request if there is insufficient free memory in said first kernel memory resource group to accommodate said request.

37. The article of manufacture of claim 36 further comprising:

computer readable code for creating a system memory class, said system memory class acting as a logical container for at least a first system memory resource group;

computer readable code for further processing said request of said kernel client, if there is sufficient free memory in said first kernel memory resource group to accommodate said request, by ascertaining whether there is sufficient free memory in said first system memory resource group to accommodate said request; and computer readable code for denying said request if there is insufficient free memory in said first system memory resource group to accommodate said request.

38. The article of manufacture of claim 36, wherein the kernel memory resource group determines a limitation on an amount of memory that can be requested by the kernel client that is affiliated with the kernel memory resource group.

* * * * *

UNITED STATES PATENT AND TRADEMARK OFFICE
CERTIFICATE OF CORRECTION

| | | |
|---|---|---|
| PATENT NO. | : 7,840,772 B2 | Page 1 of 1 |
| APPLICATION NO. | : 10/939052 | |
| DATED | : November 23, 2010 | |
| INVENTOR(S) | : Anil Rao | |

It is certified that error appears in the above-identified patent and that said Letters Patent is hereby corrected as shown below:

In column 14, line 30, delete "step" and insert -- In step --, therefor.

Signed and Sealed this
Thirty-first Day of May, 2011

David J. Kappos
*Director of the United States Patent and Trademark Office*